United States Patent
Du et al.

(10) Patent No.: US 11,445,488 B2
(45) Date of Patent: Sep. 13, 2022

(54) CONTROL INFORMATION TRANSMISSION METHOD AND DEVICE

(71) Applicant: Huawei Technologies Co., Ltd., Shenzhen (CN)

(72) Inventors: Bai Du, Shanghai (CN); Jinlin Peng, Shanghai (CN); Peng Zhang, Shanghai (CN); Toufiqul Islam, Sunnyvale, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 16/728,971

(22) Filed: Dec. 27, 2019

(65) Prior Publication Data

US 2020/0137736 A1 Apr. 30, 2020

Related U.S. Application Data

(63) Continuation of application No. PCT/CN2018/093422, filed on Jun. 28, 2018.

(30) Foreign Application Priority Data

Jun. 30, 2017 (CN) .......................... 201710525762.7
Aug. 11, 2017 (CN) .......................... 201710685344.4
(Continued)

(51) Int. Cl.
*H04W 72/04* (2009.01)
*H04W 76/27* (2018.01)
(Continued)

(52) U.S. Cl.
CPC ......... *H04W 72/042* (2013.01); *H04L 5/0005* (2013.01); *H04L 5/0048* (2013.01);
(Continued)

(58) Field of Classification Search
CPC ... H04L 5/0005; H04L 5/0048; H04L 5/0053; H04L 5/0092; H04W 72/042;
(Continued)

(56) References Cited

U.S. PATENT DOCUMENTS 9,942,846 B2 4/2018 Sheth et al.
10,063,324 B2 8/2018 Yoo et al.
(Continued)

FOREIGN PATENT DOCUMENTS

CN 102186251 A 9/2011
CN 104935395 A 9/2015
(Continued)

OTHER PUBLICATIONS

ZTE et al., URLLC and eMBB frame structure and multiplexing, Oct. 10, 2016, 3GPP TSG-RAN WG1 Meeting #86bis, Tdoc: R1-1608957 (Year: 2016).*

(Continued)

*Primary Examiner* — Eric Nowlin
(74) *Attorney, Agent, or Firm* — Slater Matsil, LLP

(57) ABSTRACT

This application provides a control information transmission method and a device, and relates to the wireless communications field, to improve data transmission efficiency. The method includes: determining, by a network device, first indication information, where the first indication information is used to indicate whether information transmission on a first time-frequency resource is affected; sending, by the network device, the first indication information through a physical downlink control channel; and receiving, by a terminal device, the first indication information, and determining, based on the first indication information, whether information transmission on a third time-frequency resource is affected, where the third time-frequency resource is a time-frequency resource that is used for downlink informa-
(Continued)

tion transmission between the terminal device and the network device.

20 Claims, 8 Drawing Sheets

(30) Foreign Application Priority Data

| Sep. 8, 2017 | (CN) | 201710804109.4 |
|---|---|---|
| Sep. 29, 2017 | (CN) | 201710906170.X |
| Nov. 10, 2017 | (CN) | 201711105497.3 |

(51) Int. Cl.
*H04L 5/00* (2006.01)
*H04W 72/12* (2009.01)

(52) U.S. Cl.
CPC .......... *H04L 5/0053* (2013.01); *H04L 5/0092* (2013.01); *H04W 72/0446* (2013.01); *H04W 72/0453* (2013.01); *H04W 72/1289* (2013.01); *H04W 76/27* (2018.02)

(58) Field of Classification Search
CPC .......... H04W 72/0446; H04W 72/0453; H04W 72/1289; H04W 76/27
See application file for complete search history.

(56) References Cited

U.S. PATENT DOCUMENTS

| 10,334,583 | B2 | 6/2019 | Fan et al. | |
| 10,567,142 | B2* | 2/2020 | Kim | H04L 1/0058 |
| 10,609,699 | B2* | 3/2020 | Park | H04W 72/1289 |
| 10,638,497 | B2* | 4/2020 | Islam | H04L 5/0094 |
| 10,680,765 | B2 | 6/2020 | Liu et al. | |
| 10,827,380 | B2* | 11/2020 | Rao | H04W 28/0268 |
| 10,863,522 | B2* | 12/2020 | Islam | H04W 72/042 |
| 10,911,982 | B2* | 2/2021 | Takeda | H04W 28/06 |
| 11,071,136 | B2* | 7/2021 | Islam | H04L 5/0064 |
| 11,095,420 | B2* | 8/2021 | Kim | H04W 52/0206 |
| 11,121,815 | B2* | 9/2021 | Ma | H04W 72/1273 |
| 2010/0272268 | A1 | 10/2010 | Sambhwani et al. | |
| 2018/0063865 | A1* | 3/2018 | Islam | H04L 5/0064 |
| 2018/0070341 | A1* | 3/2018 | Islam | H04L 1/1887 |
| 2018/0270798 | A1* | 9/2018 | Park | H04W 72/042 |
| 2018/0278454 | A1* | 9/2018 | Islam | H04L 27/2655 |
| 2018/0324816 | A1* | 11/2018 | Islam | H04L 5/0048 |
| 2018/0324830 | A1* | 11/2018 | Islam | H04W 72/1236 |
| 2019/0052432 | A1* | 2/2019 | Islam | H04L 5/0044 |
| 2019/0239112 | A1* | 8/2019 | Rao | H04W 28/06 |
| 2019/0274153 | A1* | 9/2019 | Park | H04L 5/0094 |
| 2019/0280802 | A1* | 9/2019 | Ma | H04L 1/008 |
| 2019/0306836 | A1* | 10/2019 | Hong | H04W 72/04 |
| 2019/0327748 | A1* | 10/2019 | Yang | H04W 72/042 |
| 2019/0327757 | A1* | 10/2019 | Oteri | H04W 72/0406 |
| 2019/0349795 | A1* | 11/2019 | Park | H04W 24/08 |
| 2020/0059327 | A1* | 2/2020 | Kini | H04W 72/04 |
| 2020/0059331 | A1* | 2/2020 | Wong | H04L 5/0094 |
| 2020/0128570 | A1* | 4/2020 | Wong | H04W 72/1273 |
| 2020/0186317 | A1* | 6/2020 | Kim | H04L 1/0045 |
| 2020/0288463 | A1* | 9/2020 | Lee | H04L 27/26 |
| 2020/0351887 | A1* | 11/2020 | Miao | H04W 72/0493 |
| 2021/0014866 | A1* | 1/2021 | Shi | H04L 5/0051 |
| 2021/0037552 | A1* | 2/2021 | Chen | H04W 72/1268 |
| 2021/0051706 | A1* | 2/2021 | Yang | H04W 72/0406 |
| 2021/0058938 | A1* | 2/2021 | Hosseini | H04W 52/383 |
| 2021/0083802 | A1* | 3/2021 | Zhou | H04L 47/245 |
| 2021/0092671 | A1* | 3/2021 | Manolakos | H04L 5/0048 |
| 2021/0152312 | A1* | 5/2021 | Xiong | H04L 5/0064 |
| 2021/0153242 | A1* | 5/2021 | Wong | H04L 1/1614 |
| 2021/0160903 | A1* | 5/2021 | Kim | H04L 5/0044 |
| 2021/0351862 | A1* | 11/2021 | Ma | H04W 76/11 |

FOREIGN PATENT DOCUMENTS

| CN | 105099606 | A | | 11/2015 | |
| CN | 105766047 | A | | 7/2016 | |
| CN | 106160987 | A | | 11/2016 | |
| CN | 106455103 | A | | 2/2017 | |
| CN | 106851846 | A | | 6/2017 | |
| EP | 2757847 | A1 | | 7/2014 | |
| KR | 20110135874 | A | | 12/2011 | |
| KR | 20160083039 | A | | 7/2016 | |
| KR | 20160096109 | A | | 8/2016 | |
| RU | 2514089 | C2 | | 4/2014 | |
| WO | 2010081338 | A1 | | 7/2010 | |
| WO | 2015018040 | A1 | | 2/2015 | |
| WO | 2016106576 | A1 | | 7/2016 | |
| WO | 2016112131 | A1 | | 7/2016 | |
| WO | WO-2017193330 | A1 | * | 11/2017 | H04W 72/044 |
| WO | WO-2018028154 | A1 | * | 2/2018 | H04L 1/0023 |
| WO | WO-2020029299 | A1 | * | 2/2020 | H04W 72/04 |

OTHER PUBLICATIONS

Huawei et al., On DL multiplexing of URLLC and eMBB transmissions, Jan. 16, 2017, 3GPP TSG RAN WG1 Adhoc Meeting, Tdoc: R1-1700022 (Year: 2017).*
ZTE et al., About URLLC and eMBB multiplexing in downlink, Jan. 16, 2017, 3GPP TSG RAN WG1 Adhoc Meeting, Tdoc: R1-1700264 (Year: 2017).*
Intel Corporation, Downlink Multiplexing of eMBB and URLLC Transmissions, Jan. 16, 2017, 3GPP TSG RAN WG1 Adhoc Meeting, Tdoc: R1-1700374 (Year: 2017).*
NEC, Multiplexing of eMBB and URLLC in DL, Jan. 16, 2017, 3GPP TSG RAN WG1 Adhoc Meeting, Tdoc: R1-1700448 (Year: 2017).*
Guangdong OPPO Mobile Telecom, On multiplexing eMBB and URLLC in DL, Jan. 16, 2017, 3GPP TSG RAN WG1 Adhoc Meeting, Tdoc: R1-1700572 (Year: 2017).*
NTT Docomo, Inc., On multiplexing of eMBB and URLLC in downlink, Jan. 16, 2017, 3GPP TSG RAN WG1 AH_NR Meeting, Tdoc: R1-1700626 (Year: 2017).*
Fujitsu, Preemption based Multiplexing eMBB and URLLC, Jan. 16, 2017, 3GPP TSG RAN WG1 AH_NR Meeting, Tdoc: R1-1700659 (Year: 2017).*
InterDigital Communications, Scheduling-based URLLC and eMBB multiplexing, Jan. 16, 2017, 3GPP TSG RAN WG1 AH_NR Meeting, Tdoc: R1-1700722 (Year: 2017).*
Qualcomm Incorporated, URLLC/eMBB downlink dynamic multiplexing schemes, Jan. 16, 2017, 3GPP TSG RAN WG1 AH_NR Meeting, Tdoc: R1-1700827 (Year: 2017).*
Samsung, Preemption-based multiplexing between eMBB and URLLC for DL, Jan. 16, 2017, 3GPP TSG RAN WG1 AH_NR Meeting, Tdoc: R1-1700966 (Year: 2017).*
Samsung, Summary of e-mail discussions on multiplexing eMBB and URLLC in DL, Jan. 16, 2017, 3GPP TSG RAN WG1 AH_NR Meeting, Tdoc: R1-1700972 (Year: 2017).*
CATR, Discussions on the multiplexing for eMBB and URLLC, Jan. 16, 2017, 3GPP TSG RAN WG1 AH_NR Meeting, Tdoc: R1-1701007 (Year: 2017).*
WILUS Inc., Discussion on Multiplexing between eMBB and URLLC in DL, Jan. 16, 2017, 3GPP TSG RAN WG1 AH_NR Meeting, Tdoc: R1-1701067 (Year: 2017).*
Samsung et al., Summary of offline discussion on multiplexing of eMBB and URLLC in DL, Jan. 16, 2017, 3GPP TSG RAN WG1 AH_NR Meeting, Tdoc: R1-1701456 (Year: 2017).*
NTT Docomo, Inc., On dynamic multiplexing of eMBB and URLLC for downlink, Feb. 13, 2017, 3GPP TSG RAN WG1 Meeting #88, Tdoc: R1-1702817 (Year: 2017).*
Samsung, Multiplexing of eMBB and URLLC in Downlink, Feb. 13, 2017, 3GPP TSG RAN WG1 Meeting #88, Tdoc: R1-1702994 (Year: 2017).*
WILUS Inc., Indication on multiplexing between eMBB and URLLC in DL, Feb. 13, 2017, 3GPP TSG RAN WG1 Meeting #88, Tdoc: R1-1703030 (Year: 2017).*

(56) References Cited

OTHER PUBLICATIONS

Vivo, Discussion on DL multiplexing of eMBB and URLLC, Feb. 13, 2017, 3GPP TSG RAN WG1 Meeting #88, Tdoc: R1-1703392 (Year: 2017).*
CMCC, Discussion on eMBB/URLLC multiplexing, Feb. 13, 2017, 3GPP TSG RAN WG1 Meeting #88, Tdoc: R1-1703409 (Year: 2017).*
CATR, Considerations on the eMBB and URLLC multiplexing for DL, Feb. 13, 2017, 3GPP TSG RAN WG1 Meeting #88, Tdoc: R1-1703416 (Year: 2017).*
Samsung et al., WF on Multiplexing of eMBB and URLLC in DL, Feb. 13, 2017, 3GPP TSG RAN WG1 Meeting #88, Tdoc: R1-1704055 (Year: 2017).*
Huawei et al., On pre-emption indication for DL multiplexing of URLLC and eMBB, Apr. 3, 2017, 3GPP TSG RAN WG1 Meeting #88bis, Tdoc: R1-1704215 (Year: 2017).*
Huawei et al., On DL multiplexing of URLLC and eMBB transmissions, Apr. 3, 2017, 3GPP TSG RAN WG1 Meeting #88bis, Tdoc: R1-1704216 (Year: 2017).*
MediaTek Inc., On eMBB/URLLC DL Multiplexing Indication, Apr. 3, 2017, 3GPP TSG RAN WG1 Meeting #88bis, Tdoc: R1-1704474 (Year: 2017).*
Vivo, Discussion on DL multiplexing of eMBB and URLLC, Apr. 3, 2017, 3GPP TSG RAN WG1 Meeting #88bis, Tdoc: R1-1704499 (Year: 2017).*
CATT, Multiplexing of URLLC and eMBB traffic in DL, Apr. 3, 2017, 3GPP TSG RAN WG1 Meeting #88bis, Tdoc: R1-1704586 (Year: 2017).*
Guangdong OPPO Mobile Telecom, On multiplexing eMBB and URLLC in DL, Apr. 3, 2017, 3GPP TSG RAN WG1 Meeting #88bis, Tdoc: R1-1704632 (Year: 2017).*
Intel Corporation, eMBB/URLLC multiplexing for DL, Apr. 3, 2017, 3GPP TSG RAN WG1 Meeting #88bis, Tdoc: R1-1704763 (Year: 2017).*
Apple Inc., eMBB and URLLC Multiplexing for NR, Apr. 3, 2017, 3GPP TSG RAN WG1 Meeting #88bis, Tdoc: R1-1705051 (Year: 2017).*
Spreadtrum Communications, On DL eMBB and URLLC multiplexing transmissions, Apr. 3, 2017, 3GPP TSG RAN WG1 Meeting #88bis, Tdoc: R1-1705158 (Year: 2017).*
Samsung, Multiplexing of eMBB and URLLC in Downlink, Apr. 3, 2017, 3GPP TSG RAN WG1 Meeting #88bis, Tdoc: R1-1705407 (Year: 2017).*
Interdigital Communications, On eMBB/URLLC multiplexing for TDD, Apr. 3, 2017, 3GPP TSG RAN WG1 Meeting #88bis, Tdoc: R1-1705524 (Year: 2017).*
Qualcomm Incorporated, DL indication channel design principle for URLLC/eMBB dynamic multiplexing, Apr. 3, 2017, 3GPP TSG RAN WG1 Meeting #88bis, Tdoc: R1-1705623 (Year: 2017).*
NTT Docomo, Inc., On DL dynamic multiplexing of eMBB and URLLC, Apr. 3, 2017, 3GPP TSG RAN WG1 Meeting #88bis, Tdoc: R1-1705753 (Year: 2017).*
WILUS Inc., Indication on multiplexing between eMBB and URLLC in DL, Apr. 3, 2017, 3GPP TSG RAN WG1 Meeting #88bis, Tdoc: R1-1705852 (Year: 2017).*
Sequans Communications, Puncturing indication and supplementary transmission for preemption-based multiplexing of URLLC and eMBB in DL, Apr. 3, 2017, 3GPP TSG RAN WG1 Meeting #88bis, Tdoc: R1-1705882 (Year: 2017).*
Samsung, Partial preemption-based multiplexing for eMBB and URLLC in DL, Apr. 3, 2017, 3GPP TSG RAN WG1 Meeting #88bis, Tdoc: R1-1706133 (Year: 2017).*
Huawei et al., On DL multiplexing of URLLC and eMBB transmissions, Apr. 3, 2017, 3GPP TSG RAN WG1 Meeting #88bis, Tdoc: R1-1706170 (Year: 2017).*
Apple Inc., eMBB and URLLC Multiplexing for NR, May 15, 2017, 3GPP TSG-RAN WG1 #89, Tdoc: R1-1708279 (Year: 2017).*
InterDigital Inc., Multiplexing of low-latency traffic and non-latency sensitive traffic in UL, May 15, 2017, 3GPP TSG-RAN WG1 #89, Tdoc: R1-1708355 (Year: 2017).*
Qualcomm Incorporated, DL indication channel design principle for URLLC/eMBB dynamic multiplexing, May 15, 2017, 3GPP TSG-RAN WG1 #89, Tdoc: R1-1708637 (Year: 2017).*
Sequans Communications, On multiplexing of URLLC and eMBB in DL, May 15, 2017, 3GPP TSG-RAN WG1 #89, Tdoc: R1-1708954 (Year: 2017).*
WILUS Inc., Pre-emption indication on DL multiplexing between eMBB and URLLC, May 15, 2017, 3GPP TSG-RAN WG1 #89, Tdoc: R1-1708980 (Year: 2017).*
Huawei et al., On pre-emption indication for DL multiplexing of URLLC and eMBB, Jun. 27, 2017, 3GPP TSG RAN WG1 NR Ad Hoc Meeting, Tdoc: R1-1709984 (Year: 2017).*
Sony, Remaining issues on using pre-emption indicator for DL URLLC/eMBB multiplexing, Jun. 27, 2017, 3GPP TSG RAN WG1 NR Ad-Hoc#2, Tdoc: R1-1710865 (Year: 2017).*
LG Electronics: "Discussion on indication method for impacted resources for downlink", 3GPP TSG RAN WG1 Meeting #88bis, R1-1704922, Apr. 2, 2017, 9 pages.
Huawei et al.,"On pre-emption indication for DL multiplexing of URLLC and eMBB", 3GPP TSG RAN WG1 Meeting #89 R1-1708124, May 15-May 19, 2017, 9 pages, Hangzhou, China.
Spreadtrum Communications, "Discussion on pre-emption indication method for DL multiplexing of URLLC and eMBB", 3GPP TSG RAN WG1 meeting #89 R1-1707788, May 15-19, 2017, 4 pages, Hangzhou, China.
Huawei et al., "On pre-emption indication for DL multiplexing of URLLC and eMBB", 3GPP TSG RAN WG1 NR Ad Hoc Meeting R1-1709984, Jun. 27-30, 2017, 5 pages, Qingdao, China.
Intel Corporation: "eMBB/URLLC multiplexing for DL", 3GPP TSG RAN1 WG Meeting #88bis R1-1704763, Apr. 3-7, 2017, 6 pages, Spokane, USA.
Intel Corporation, "Indication of preemption of DL transmissions", 3GPP TSG RAN WG1 Meeting #89 R1-1707414, May 15-19, 2017, 6 pages, Hangzhou, P.R. China.
Ericsson, "On Pre-emption Indication for Downlink", 3GPP TSG RAN WG1 NR Ad-Hoc#2 R1-1711513, Jun. 27-30, 2017, 2 pages, Qingdao, P.R. China.
NTT Docomo et al: "On dynamic multiplexing of eMBB and URLLC for downlink", 3GPP Draft; R1-1702817, Feb. 12, 2017 (Feb. 12, 2017), 4 pages, Athens, Greece.
"3rd Generation Partnership Project;Technical Specification Group Radio Access Network;NR;Radio Resource Control (RRC);Protocol specification(Release 15)"; 3GPP TS 38.331 V0.0.4 (Jun. 2017); 22 pages.
Fujitsu: "Discussion on Preemption Indicator for Multiplexing eMBB and URLLC in Downlink", 3GPP TSG-RAN WG1 Meeting#88; R1-1701920, Feb. 12, 2017 (Feb. 12, 2017), 5 pages, Athens, Greece.
Intel Corporation: "NR Group Conrnon PDCCH", 3GPP TSG RAN WG1 #88bis R1-1704745, Apr. 2, 2017 (Apr. 2, 2017), 4 pages, Spokane, USA.
ZTE, "About pre-emption indication", 3GPP TSG RAN WG1 NR Ad-Hoc#2, R1-1710123, Jun. 27-30, 2017, 6 pages.
Samsung, "Indication structure for impacted eMBB resource regions at current eMBB TTI", 3GPP TSG RAN WG1 Meeting #88bis, R1-1705414, Apr. 3-7, 2017, 6 pages.
Huawei, HiSilicon, "On pre-emption indication for DL multiplexing of URLLC and eMBB", 3GPP TSG RAN WG1 Meeting #89, R1-1708124, May 15-May 19, 2017, 9 pages, Hangzhou, China.
Wanshu, H., "Research on Development of the Remote Real-Time Transmission System of Video and Control Information", Dissertation for the Master degree in Engineering, Yanshan University, May 4, 2007, 76 pages.

* cited by examiner

CONTROL INFORMATION TRANSMISSION METHOD AND DEVICE

CROSS-REFERENCE TO RELATED APPLICATIONS

This application is a continuation of International Application No. PCT/CN2018/093422, filed on Jun. 28, 2018, which claims priority to Chinese Patent Application No. 201710525762.7, filed on Jun. 30, 2017, Chinese Patent Application No. 201710685344.4, filed on Aug. 11, 2017, Chinese Patent Application No. 201710804109.4, filed on Sep. 8, 2017, Chinese Patent Application No. 201710906170.X, filed on Sep. 29, 2017, and Chinese Patent Application No. 201711105497.3, filed on Nov. 10, 2017, The disclosures of the aforementioned applications are incorporated herein by reference in their entireties.

TECHNICAL FIELD

Embodiments of this application relate to the wireless communications field, and in particular, to a control information transmission method and a device in a wireless communications system.

BACKGROUND

A mobile communications technology has profoundly changed people's life, but people are still in pursuit of a higher-performance mobile communications technology. To cope with an explosive mobile data traffic increase, massive mobile communications device connections, and continuous emergence of various new services and application scenarios in the future, the fifth generation (5G) mobile communications system emerges as the times require. The international telecommunication union (ITU) defines three types of application scenarios for 5G and a future mobile communications system: enhanced mobile broadband (eMBB), ultra-reliable and low latency communications (URLLC), and massive machine type communications (mMTC).

Typical eMBB services include an ultra-high definition video, augmented reality (AR), virtual reality (VR), and the like. These services are mainly characterized by a large data transmission amount and a very high transmission rate. Typical URLLC services include tactile interaction applications such as wireless control in an industrial manufacturing or production process, motion control and remote repair of a self-driving car and an unmanned aerial vehicle, and remote medical surgery. These services are mainly characterized by requirements for ultra-high reliability and a low latency, a relatively small data transmission amount, and burstiness. Typical mMTC services include smart grid power distribution automation, a smart city, and the like that are mainly characterized by a huge quantity of web-connected devices, a relatively small data transmission amount, and insensitivity of data to a transmission latency. These mMTC terminals need to meet requirements for low costs and a very long standby time.

Different services have different requirements for a mobile communications system. How to better meet all data transmission requirements of a plurality of different services is a technical problem to be resolved in the current 5G mobile communications system. For example, how to support both a URLLC service and an eMBB service is one of hot topics discussed for the current 5G mobile communications system.

Because the eMBB service has a relatively large data amount and a relatively high transmission rate, for the eMBB service, a relatively long time unit is usually used for data transmission, to improve transmission efficiency. For example, one slot at a subcarrier spacing of 15 kHz is used, where the slot corresponds to seven time domain symbols and corresponds to a time length of 0.5 millisecond (ms). For URLLC service data, a relatively short time unit is usually used, to meet a requirement for an ultra-low latency. For example, two time domain symbols at a subcarrier spacing of 15 kHz are used, or one slot at a subcarrier spacing of 60 kHz is used, where the slot corresponds to seven time domain symbols and corresponds to a time length of 0.125 ms.

Due to burstiness of the URLLC service data, to improve system resource utilization, a network device usually reserves no resource for transmitting downlink data of the URLLC service. When the URLLC service data arrives at the network device, if there is no idle time-frequency resource at this time, to meet the requirement of the URLLC service for an ultra-low latency, the network device cannot perform scheduling for the URLLC service data after transmission of currently-scheduled eMBB service data is completed. The network device may allocate a resource to the URLLC service data in a preemption manner. As shown in FIG. 1, preemption herein means that the network device selects a part or all of an allocated time-frequency resource used to transmit the eMBB service data, for transmitting the URLLC service data, and the network device does not send the eMBB service data on the time-frequency resource used to transmit the URLLC service data.

How to enable a terminal device receiving the eMBB service data to learn of data that is affected by the URLLC service data is a technical problem to be resolved in this application.

SUMMARY

This application provides a control information transmission method, to indicate eMBB service data that is affected by URLLC service data, thereby improving data transmission efficiency.

According to a first aspect, a control information transmission method is provided. The method includes: determining, by a network device, first indication information, where the first indication information is used to indicate whether information transmission on a first time-frequency resource is affected; and sending, by the network device, the first indication information through a physical downlink control channel. In the control information transmission method, the network device sends the first indication information to a terminal device through the physical downlink control channel, to notify whether data transmission of the terminal device is affected by other information transmission, including whether a resource for the data transmission of the terminal device is preempted by other information transmission and whether the data transmission of the terminal device is interfered with by other information transmission, thereby assisting the terminal device in data reception and decoding. In this application, the first indication information is also referred to as preemption indication information. After receiving the first indication information, the terminal device determines whether data transmission on a part or all of a time-frequency resource is affected by other information transmission, and if data transmission on a part or all of a time-frequency resource is affected by other information transmission, may discard corresponding data in an affected region, where the data in the region does not participate in decoding or HARQ combination, thereby improving a decoding success rate and improving data transmission efficiency.

In a possible implementation of the first aspect, the network device sends first control information, where the first control information includes frequency domain location information of the first time-frequency resource. To simplify a design of a preemption indication, a resource region for the preemption indication may be defined and is referred to as a PI region (corresponding to the first time-frequency resource). The preemption indication is used to indicate a specific preempted time-frequency resource in the PI region. The first control information herein is used to indicate a time-frequency range of the PI region, so that the terminal device can determine, based on the first indication information and the first control information, a time-frequency resource on which data transmission is affected.

In a possible implementation of the first aspect, the frequency domain location information of the first time-frequency resource includes start location offset information and frequency domain width information. The terminal device receives the frequency domain location information in the first control information, to determine a frequency domain location of the PI region. Reference point information of a frequency domain location of the first time-frequency resource may be included in the frequency domain location information and sent by the network device to the terminal device, or may be predefined in a system. Time domain location information of the first time-frequency resource may be predefined in the system, or may be included in the first control information and sent by the network device to the terminal device.

In a possible implementation of the first aspect, the first indication information includes second indication information with a length of m bits, where m is an integer greater than 1, each bit in the second indication information is used to indicate whether information transmission on one second time unit in the first time-frequency resource is affected, and a time domain length of the second time unit is less than a time domain length of the first time-frequency resource. In this implementation, the PI region may be divided into m second time units in time domain, to indicate, by using the first indication information, whether resource preemption occurs on each second time unit.

In a possible implementation of the first aspect, the first indication information includes second indication information with a length of m bits, and each bit in the second indication information is used to indicate whether information transmission on one second time-frequency resource in the first time-frequency resource is affected, where m is an integer greater than 1, and a frequency domain width of the second time-frequency resource is less than or equal to a frequency domain width of the first time-frequency resource. In this implementation, the PI region may be divided into m second time-frequency resources in both a time dimension and a frequency dimension, to indicate, by using the first indication information, whether resource preemption occurs on each second time-frequency resource. In this way, an indicated granularity can be finer, to avoid a case in which data on a partial time-frequency resource on which no preemption occurs is also discarded by the terminal device due to an excessively coarse indicated granularity, thereby improving data transmission efficiency.

In a possible implementation of the first aspect, the network device notifies the terminal device of a CSI feedback time sequence parameter $\Delta t1$ or $\Delta t2$ by using RRC signaling or physical layer signaling, where $\Delta t1=T3-T1$, $\Delta t2=T3-T2$, T1 is a moment at which the terminal device receives the first indication information, T2 is a moment at which the terminal device feeds back CSI based on a CSI-RS that is received at a moment T0, and T3 is a moment at which the terminal device feeds back updated CSI.

In a possible implementation of the first aspect, when the first indication information indicates that a part or all of a time-frequency resource for the CSI-RS of the terminal device is preempted or affected at the moment T0, the network device receives a CSI measurement result from the terminal device at the moment T3. According to the method in this implementation, the terminal device can feed back a more accurate CSI measurement result to the network device, thereby improving data transmission efficiency.

According to a second aspect, a control information transmission method is provided. The method includes: receiving, by a terminal device, first indication information through a physical downlink control channel, where the first indication information is used to indicate whether information transmission on a first time-frequency resource is affected; and determining, by the terminal device based on the first indication information, whether information transmission on a third time-frequency resource is affected, where the third time-frequency resource is a time-frequency resource that is used for downlink information transmission between the terminal device and a network device.

The control information transmission method according to the second aspect is a method on a receiving device side that corresponds to the control information transmission method according to the first aspect, and therefore can also achieve the beneficial effects of the method according to the first aspect or the corresponding possible implementations of the first aspect. Details are not described herein again.

In a possible implementation of the second aspect, the terminal device receives first control information, where the first control information includes frequency domain location information of the first time-frequency resource.

In a possible implementation of the second aspect, the frequency domain location information of the first time-frequency resource includes start location offset information and frequency domain width information.

In a possible implementation of the second aspect, the first indication information includes second indication information with a length of m bits, where m is an integer greater than 1, each bit in the second indication information is used to indicate whether information transmission on one second time unit in the first time-frequency resource is affected, and a time domain length of the second time unit is less than a time domain length of the first time-frequency resource.

In a possible implementation of the second aspect, the first indication information includes second indication information with a length of m bits, and each bit in the second indication information is used to indicate whether information transmission on one second time-frequency resource in the first time-frequency resource is affected, where m is an integer greater than 1, and a frequency domain width of the second time-frequency resource is less than or equal to a frequency domain width of the first time-frequency resource.

In a possible implementation of the second aspect, when a monitoring occasion of the first indication information arrives, the terminal device determines whether there is data or control information to be sent to the terminal device on the first time-frequency resource corresponding to the monitoring occasion of the first indication information, and monitors the first indication information if there is data or control information to be sent to the terminal device on the first time-frequency resource, to determine whether the network device sends the first indication information. In this implementation, the terminal device monitors the first indication information only when necessary, so that a processing resource of the terminal device can be saved, to reduce energy consumption of the terminal device.

In a possible implementation of the second aspect, the terminal device receives a CSI feedback time sequence parameter Δt1 or Δt2 from the network device by using RRC signaling or physical layer signaling, where Δt1=T3−T1, Δt2=T3−T2, T1 is a moment at which the terminal device receives the first indication information, T2 is a moment at which the terminal device feeds back CSI based on a CSI-RS that is received at a moment T0, and T3 is a moment at which the terminal device feeds back updated CSI.

In a possible implementation of the second aspect, when the first indication information indicates that a part or all of a time-frequency resource for the CSI-RS is preempted or affected at the moment T0, the terminal device may eliminate, based on content of the first indication information, a part of the CSI-RS on the preempted or affected time-frequency resource, perform CSI measurement again on a remaining part of the CSI-RS to update a CSI measurement result, and feed back an updated CSI measurement result to the network device at the moment T3. According to the method in this implementation, the terminal device can feed back a more accurate CSI measurement result to the network device, thereby improving data transmission efficiency.

According to a third aspect, a communications apparatus is provided. The communications apparatus includes a processing unit and a sending unit, to perform the method according to any one of the first aspect or the possible implementations of the first aspect.

According to a fourth aspect, a communications apparatus is provided. The communications apparatus includes a processor, a memory, and a transceiver, to perform the method according to any one of the first aspect or the possible implementations of the first aspect.

According to a fifth aspect, a communications apparatus is provided. The communications apparatus includes a processing unit and a receiving unit, to perform the method according to any one of the second aspect or the possible implementations of the second aspect.

According to a sixth aspect, a communications apparatus is provided. The communications apparatus includes a processor, a memory, and a transceiver, to perform the method according to any one of the second aspect or the possible implementations of the second aspect.

According to a seventh aspect, a computer-readable storage medium is provided. The computer-readable storage medium stores an instruction, and when the instruction runs on a computer, the computer performs the method according to any one of the first aspect or the possible implementations of the first aspect.

According to an eighth aspect, a computer-readable storage medium is provided. The computer-readable storage medium stores an instruction, and when the instruction runs on a computer, the computer performs the method according to any one of the second aspect or the possible implementations of the second aspect.

According to a ninth aspect, a computer program product including an instruction is provided. When the instruction runs on a computer, the computer performs the method according to any one of the first aspect or the possible implementations of the first aspect.

According to a tenth aspect, a computer program product including an instruction is provided. When the instruction runs on a computer, the computer performs the method according to any one of the second aspect or the possible implementations of the second aspect.

According to an eleventh aspect, a chip product of a network device is provided, to perform the method according to any one of the first aspect or the possible implementations of the first aspect.

According to a twelfth aspect, a chip product of a terminal device is provided, to perform the method according to any one of the second aspect or the possible implementations of the second aspect.

DETAILED DESCRIPTION OF ILLUSTRATIVE EMBODIMENTS

The following describes the technical solutions in the embodiments of this application with reference to the accompanying drawings in the embodiments of this application.

Figure 1:
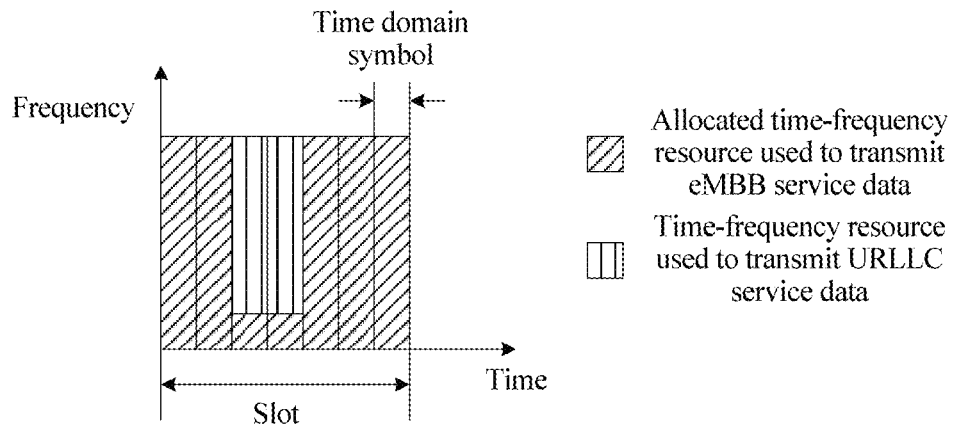
FIG. 1 is a schematic diagram in which URLLC service data preempts a time-frequency resource used to transmit eMBB service data.
Figure 2:
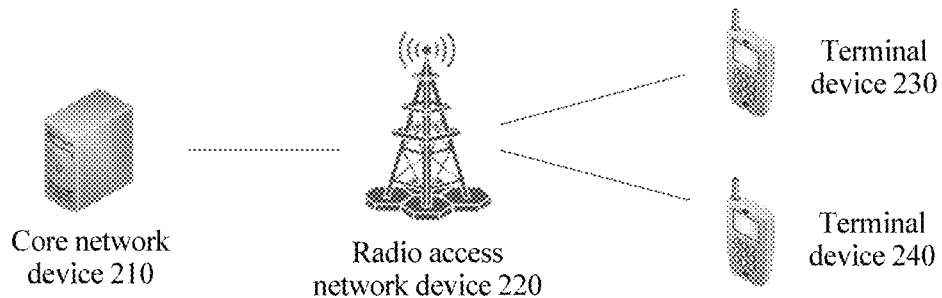
FIG. 2 is a schematic architectural diagram of a mobile communications system to which an embodiment of this application is applied.

FIG. 2 is a schematic architectural diagram of a mobile communications system to which an embodiment of this application is applied. As shown in FIG. 2, the mobile communications system includes a core network device 210, a radio access network device 220, and at least one terminal device (for example, a terminal device 230 and a terminal device 240 in FIG. 2). The terminal device is connected to the radio access network device in a wireless manner, and the radio access network device is connected to the core network device in a wireless or wired manner. The core network device and the radio access network device may be different physical devices that are independent of each other, or a function of the core network device and a logical function of the radio access network device may be integrated into a same physical device, or some functions of the core network device and some functions of the radio access network device may be integrated into one physical device. The terminal device may be at a fixed location or may be mobile. FIG. 2 is merely a schematic diagram, and the communications system may further include other network devices, for example, may further include a wireless relay device and a wireless backhaul device that are not drawn in FIG. 2. Quantities of core network devices, radio access network devices, and terminal devices that are included in the mobile communications system are not limited in this embodiment of this application.

The radio access network device is an access device accessed by the terminal device in a wireless manner in the mobile communications system, and may be a NodeB, an evolved NodeB (eNodeB), a base station in a 5G mobile communications system or a new radio (NR) communications system, a base station in a future mobile communications system, an access node in a WiFi system, or the like. A specific technology and a specific device form used by the radio access network device are not limited in this embodiment of this application. In this application, the radio access network device is briefly referred to as a network device. Unless otherwise specified, in this application, all network devices are radio access network devices. In this application, the terms 5G and NR may be equivalent.

The terminal device may also be referred to as a terminal, user equipment (UE), a mobile station (MS), a mobile terminal (MT), or the like. The terminal device may be a mobile phone, a tablet computer (Pad), a computer with a wireless sending/receiving function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

The radio access network device and the terminal device each may be deployed on land, and include an indoor device, an outdoor device, a handheld device, or an in-vehicle device; or may be deployed on the water; or may be deployed on an airplane, a balloon, or a satellite in the air. An application scenario of the radio access network device and the terminal device is not limited in this embodiment of this application.

This embodiment of this application is applicable to downlink signal transmission, is also applicable to uplink signal transmission, and is further applicable to device-to-device (D2D) signal transmission. For the downlink signal transmission, a sending device is the radio access network device, and a corresponding receiving device is the terminal device. For the uplink signal transmission, a sending device is the terminal device, and a corresponding receiving device is the radio access network device. For the D2D signal transmission, a sending device is a terminal device, and a corresponding receiving device is also a terminal device. A signal transmission direction is not limited in this embodiment of this application.

Communication between the radio access network device and the terminal device and communication between terminal devices may be performed by using a licensed spectrum, or may be performed by using an unlicensed spectrum, or may be performed by using both a licensed spectrum and an unlicensed spectrum. The communication between the radio access network device and the terminal device and the communication between terminal devices may be performed by using a spectrum below 6 GHz, or may be performed by using a spectrum above 6 GHz, or may be performed by using both a spectrum below 6 GHz and a spectrum above 6 GHz. A spectrum resource used for the radio access network device and the terminal device is not limited in this embodiment of this application.

Downlink transmission between a sending device that is the network device and a receiving device that is the terminal device is used as an example below for description. However, a similar method may also be applied to uplink transmission between a sending device that is the terminal device and a receiving device that is the network device, and applied to D2D transmission between a sending device that is a terminal device and a receiving device that is also a terminal device.

As described in the background, the network device may allocate a resource to a URLLC service in a preemption manner. When URLLC service data preempts a part or all of a time-frequency resource used to transmit eMBB service data, transmit power of the eMBB service data on the preempted time-frequency resource is set to zero, or no eMBB service data is sent on the preempted time-frequency resource. This may also be understood that the eMBB service data is punctured or the time-frequency resource used to transmit the eMBB service data is punctured. If a terminal device receiving the eMBB service data does not learn of data that is affected by the preemption, the terminal device may consider the URLLC service data as eMBB service data for decoding and hybrid automatic repeat request (HARQ) combination. Consequently, performance of decoding and HARQ combination of the eMBB service data is severely affected.

When the time-frequency resource used to transmit the eMBB service data is preempted by the URLLC service data or is affected by other interference, the network device may send indication information for assisting in reception to the terminal device. The indication information for assisting in reception is used to notify the terminal device of a time-frequency region affected by the preemption or the interference, to assist the terminal device in data reception and decoding. For the network device, after receiving the indication information for assisting in reception, the terminal device may discard corresponding data that is received in the affected time-frequency region, where the data in the region does not participate in decoding or HARQ combination, thereby improving a decoding success rate and improving data transmission efficiency. When the time-frequency resource used to transmit the eMBB service data is preempted by the URLLC service data, the indication information for assisting in reception may also be referred to as a puncturing indication or a preemption indication (PI). A specific name of the indication information for assisting in reception is not limited in this application.

The indication information for assisting in reception may be further used to indicate that a part of the time-frequency resource used to transmit the eMBB service data is a reserved resource or an interference management resource. The reserved resource herein may be reserved for use in a long term evolution (LTE) system. For example, the first three time domain symbols of a subframe may be reserved for use by a physical downlink control channel (PDCCH) in LTE. The interference management resource herein may be a time-frequency resource used to send a reference signal or a zero-power reference signal.

In this application, the following several time-frequency resources are all briefly referred to as occupied time-frequency resources: a reserved time-frequency resource in the time-frequency resource used to transmit the eMBB service data, a time-frequency resource used for interference management in the time-frequency resource used to transmit the eMBB service data, and a time-frequency resource used to transmit other service data or other signaling in the time-frequency resource used to transmit the eMBB service data. The time-frequency resource used to transmit the eMBB service data may be occupied in two types of different manners. In one type, the time-frequency resource used to transmit the eMBB service data is occupied in a preemption manner, and in this case, eMBB data on an occupied time-frequency resource is punctured, or it may be understood that transmit power of eMBB service data on an occupied time-frequency resource is set to zero. In the other type, the time-frequency resource used to transmit the eMBB service data is occupied in a rate matching manner, no eMBB service data is carried on an occupied time-frequency resource, and when performing data mapping for the eMBB service data, the network device does not use the occupied time-frequency resource as a time-frequency resource for carrying the eMBB data.

An example in which the URLLC service data preempts the time-frequency resource used to transmit the eMBB service data is used to describe this embodiment of this application. It may be understood that, this embodiment of this application may also be applied to another application scenario in which, for example, first information preempts a time-frequency resource used to transmit second information, or first information and second information are sent on a same time-frequency resource and cause interference to each other. The application scenario is not limited in this application. Herein, a service whose data is affected may be a uMTC service or another service in addition to an eMBB service. It may be understood that, the first information may occupy the time-frequency resource used to transmit the second information in two manners. One manner is the preemption manner described above, and the other manner is the rate matching manner described above.

Figure 3:
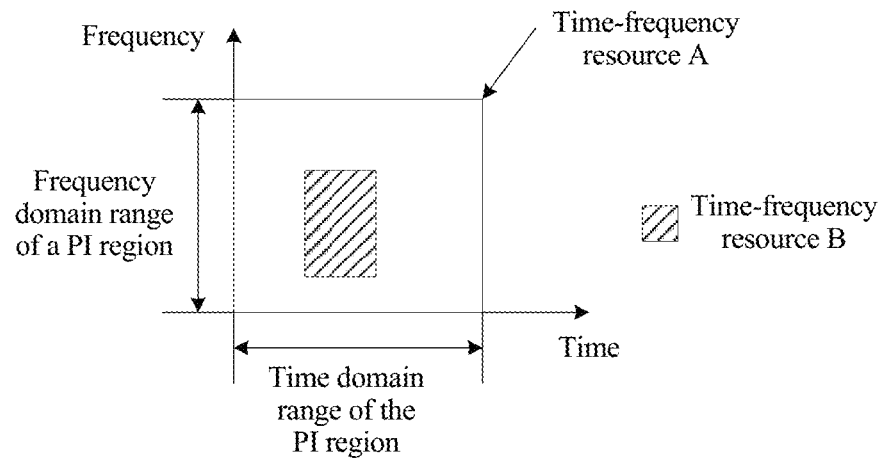
FIG. 3 is a schematic diagram of a relationship between a PI region and a preempted time-frequency resource according to an embodiment of this application.

As described above, to assist an eMBB terminal device in data reception, the network device may send preemption indication information to the eMBB terminal device, to notify the eMBB terminal device of a preempted time-frequency resource. To simplify a design of a preemption indication, a resource region for the preemption indication may be defined and is referred to as a PI region. The preemption indication is used to indicate a specific preempted time-frequency resource in the PI region. FIG. 3 provides an example of a relationship between a PI region and a preempted time-frequency resource. As shown in FIG. 3, a time-frequency resource A is the PI region, and a time-frequency resource B is the preempted time-frequency resource. When a time-frequency resource in the PI region is all preempted, the time-frequency resource B is equal to the time-frequency resource A. It may be understood that, due to a problem that a granularity indicated by the PI is not sufficiently fine, the indicated preempted time-frequency resource B may be larger than a time-frequency resource region in which preemption actually occurs.

The PI may be sent by using two methods as described in the following.

In one method, a UE-specific PI is used, that is, one PI is sent to each eMBB UE, and the PI is used to indicate a location of a preempted or punctured time-frequency resource and is carried in UE-specific downlink control information (DCI). The DCI is sent by the network device to the UE through a physical downlink control channel (PDCCH). Herein, that one PI is sent to each eMBB UE may be that the PI is sent to each eMBB UE that currently performs data transmission, or may be that the PI is sent to each eMBB UE that encounters resource preemption. In this case, the PI region is a resource allocated to the eMBB UE for data transmission.

In the other method, a group common PI is used, that is, one PI is sent to one group of eMBB UEs, and the PI is used to indicate a location of a preempted or punctured time-frequency resource of the group of UEs and is carried in common DCI sent to the group of UEs. The common DCI is sent by the network device to the group of UEs through a PDCCH. In this case, the PI region may include a time-frequency resource used to transmit service data of a plurality of eMBB UEs. After receiving the PI, each UE in the group of eMBB UEs determines an intersection between a scheduled time-frequency resource of the UE and the time-frequency resource B, and the intersection is a location of a punctured time-frequency resource of the UE.

When the PI is sent in a group common manner, some problems may need to be resolved.

The group common PI needs to be sent to a plurality of eMBB UEs in a same group, and different UEs in the same group may differ in all of parameters such as a transmission time interval (TTI), data transmission duration in one time of scheduling, and a subcarrier spacing. Therefore, a method is required for determining the PI region, to enable each UE in the group to determine the preempted or punctured time-frequency resource B based on a range of the PI region and information in the PI, and further determine, with reference to a time-frequency resource allocated to the UE, a preempted or punctured time-frequency resource C in the time-frequency resource allocated to the UE, so that the UE specially processes data received on the time-frequency resource C, for example, discards the data on the time-frequency resource C, where the data on the time-frequency resource C does not participate in decoding or HARQ combination.

To simplify a design of the PI, the network device and the UE need to determine a time-frequency resource granularity that can be indicated by the PI. When a fixed time-frequency resource granularity is used, a quantity of bits required by the PI used to indicate a preempted resource changes when the PI region changes.

In another possible implementation, a quantity of bits of the PI is fixed. When the PI region changes, a time-frequency resource granularity indicated by each bit of the corresponding PI also changes.

The embodiments of this application are described below. Unless otherwise specified, meanings of terms and variables used in the embodiments of this application are kept consistent and mutual reference may be made to the meanings of terms and variables used in the embodiments of this application.

Embodiment 1: How to Determine a PI Region

Determining of the PI region is divided into three parts: determining of a time domain location, a frequency domain location, and a numerology of the PI region.

(I) Determining of the Time Domain Location of the PI Region

In a possible design, a PI sending period is T first time units. When a PI is sent on an $N^{th}$ first time unit, the time domain location of the PI region is from an $(N-X)^{th}$ first time unit to an $(N-Y)^{th}$ first time unit, where T and N are positive integers, X is an integer greater than 0 and less than or equal to N, Y is an integer greater than or equal to 0 and less than N, and X is greater than Y. A time domain length of the PI region is X−Y+1 first time units. In a possible design, T=X−Y+1, that is, the PI sending period is equal to the time domain length of the PI region. Specifically, X=T, and Y=1; or X=T−1, and Y=0. For example, when the PI sending period is four slots, X=4 and Y=1 are configured. In this case, when the PI is sent on the fifth slot, the time domain location of the PI region is from the first slot to the fourth slot.

In another possible design, a PI sending period is one first time unit. When a PI is sent on an $N^{th}$ first time unit, the time domain location of the PI region is an $(N-X)^{th}$ first time unit, where X is an integer greater than or equal to 0 and less than or equal to N.

Figure 3A:
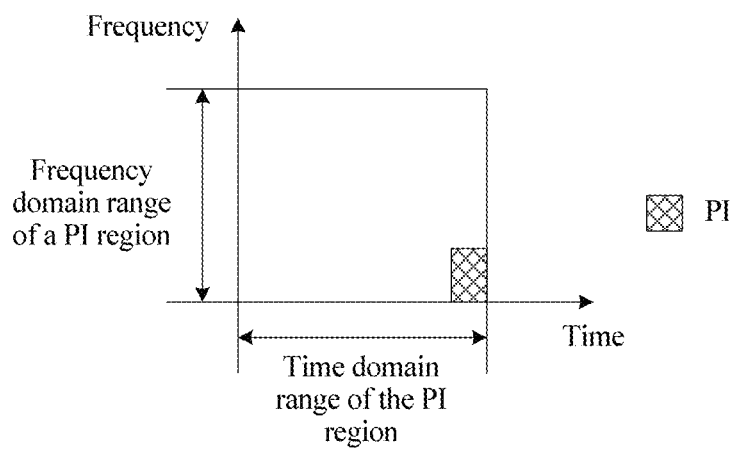
FIG. 3A is a schematic diagram of a relationship between a time unit for sending a PI and a time domain range of a PI region according to an embodiment of this application.
Figure 3B:
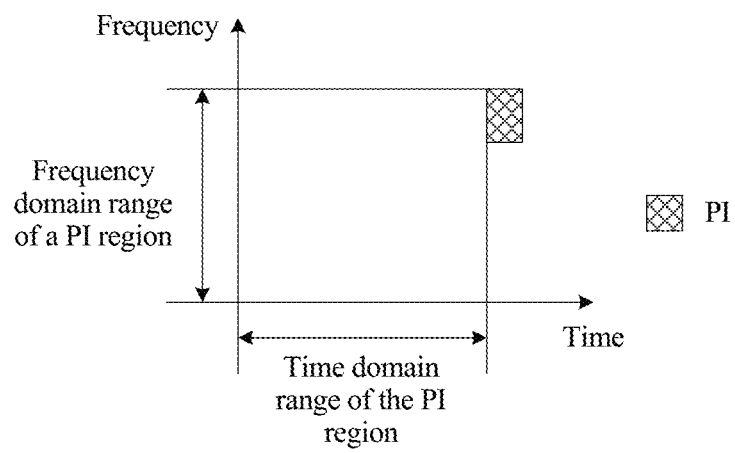
FIG. 3B is a schematic diagram of another relationship between a time unit for sending a PI and a time domain range of a PI region according to an embodiment of this application.

It may be understood that, as shown in FIG. 3A, a time unit for sending the PI may be a time unit within a time domain range of the PI region; or as shown in FIG. 3B, a time unit for sending the PI may be a time unit outside a time domain range of the PI region. A relationship between the time unit for sending the PI and the time domain range of the PI region is not limited in this application.

The first time unit herein may be a time unit in a specific numerology, and may be specifically a time domain symbol, a mini-slot, a slot, a subframe, or the like in the numerology; or the first time unit may be a numerology independent time unit, for example, may be 1 ms, 0.5 ms, 0.25 ms, 0.125 ms, or 0.25 microsecond (μs). The numerology herein includes a subcarrier spacing (SCS) and a cyclic prefix (CP) length. Different numerologies differ in at least one of the SCS and the CP length. For example, in a type of numerology, an SCS is equal to 15 kilohertz (kHz), and a CP is a normal CP; in a type of numerology, an SCS is equal to 60 kHz, and a CP is a normal CP; in a type of numerology, an SCS is equal to 15 kHz, and a CP is an extended CP; or in a type of numerology, an SCS is 60 kHz, and a CP is an extended CP.

The time domain location of the PI region may be predefined in a system. For example, time domain locations of the PI region in different scenarios are determined in a protocol. Alternatively, the time domain location of the PI region may be determined by a network device and then notified by the network device to UE by using signaling. The signaling in this application may be radio resource control (RRC) signaling or physical layer signaling, or may be medium access control (MAC) layer signaling. Unless otherwise specified, control information transmission or signaling notification in this application may be implemented by using one or more of RRC signaling, physical layer signaling, or MAC layer signaling. The physical layer signaling is usually carried in a PDCCH.

The network device may configure different PI monitoring periods based on service attributes of UEs. For example, for an mMTC service, a relatively long PI monitoring period is configured for UE. Further, the network device may put UEs of a same service type into a same group, and the network device determines the PI sending period based on a PI monitoring period of the UEs in the same group, and determines the time domain length of the PI region. For example, in a possible implementation, the time domain length of the PI region is equal to the PI sending period and equal to the PI monitoring period.

(II) Determining of the Frequency Domain Location of the PI Region

A concept of a bandwidth part (BWP) is introduced to 5G. The BWP is a concept in frequency domain and is a segment of resources in frequency domain that may be continuous or discrete. After the network device configures a BWP for UE, all data transmission of the UE is performed on the BWP. Different BWPs may be configured for different UEs. For each UE, in addition to each-UE-specific BWP for data transmission, a common BWP for a group of UEs may be configured. Herein, the common BWP is referred to as a default BWP.

The frequency domain location of the PI region may be predefined in a system. For example, frequency domain locations of the PI region in different scenarios are determined in a protocol. Alternatively, the frequency domain location of the PI region may be determined by the network device and then notified by the network device to the UE by using signaling.

The frequency domain location of the PI region may be indicated by using a predefined parameter as a reference point. The predefined parameter may be one of the following parameters: a synchronization signal block (SS block), the default BWP, a downlink carrier center, and a direct current (DC) subcarrier. In NR, the SS block includes a primary synchronization signal, a secondary synchronization signal, and a physical broadcast channel (PBCH), and is used by a UE to perform initial access. The network device may configure a plurality of SS blocks in frequency domain, and the UE may detect the plurality of SS blocks and select one of the plurality of SS blocks for access. The downlink carrier center is a center frequency of a downlink carrier. The DC subcarrier is a direct current component of a carrier. The center frequency is used as the DC subcarrier in LTE, but the center frequency of the downlink carrier may not be used in NR.

Figure 4:
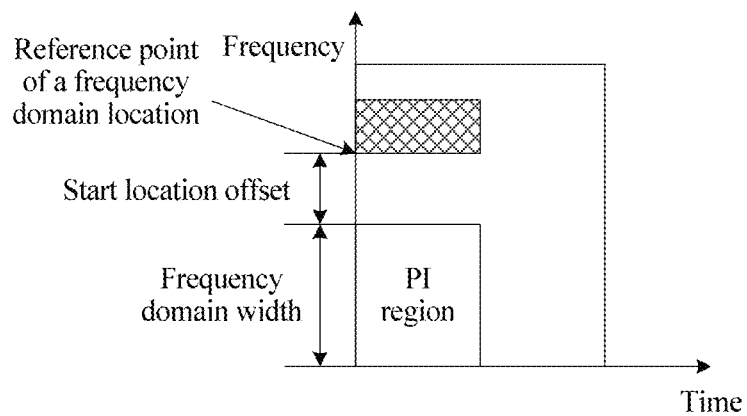
FIG. 4 is a schematic diagram of a method for determining a frequency domain location of a PI region according to an embodiment of this application.

An SS block used when the UE performs access is used as a reference point below, to indicate the frequency domain location of the PI region. Three possible indication manners are listed below:

(1) As shown in FIG. 4, an offset of a frequency domain start location of the PI region relative to the SS block and a frequency domain width of the PI region are indicated. Because the SS block is a range in frequency domain, a frequency domain start location, a frequency domain end location, a frequency domain midpoint, or the like of the SS block may be used as a reference point when the offset is indicated and calculated. In FIG. 4, the frequency domain end location of the SS block is used as a reference point to calculate the offset of the frequency domain start location of the PI region.

(2) An offset of a frequency domain end location of the PI region relative to the SS block and a frequency domain width of the PI region are indicated.

(3) Offsets of a start location and an end location of the PI region relative to the SS block are indicated.

Because the default BWP and the SS block are similar and both correspond to a segment of resources in frequency domain, a method for indicating the frequency domain location of the PI region based on the default BWP can be directly obtained according to the foregoing method for indicating the frequency domain location of the PI region based on the SS block. Details are not described herein.

A method for indicating the frequency domain location of the PI region by using the downlink carrier center as a reference point may be directly obtained by referring to the indication method in which the frequency domain end location of the SS block is used as a reference in FIG. 4. Details are not described herein.

Herein, related parameters used to indicate the frequency domain location of the PI region, such as the offset and the frequency domain width, may be provided by referring to a numerology. For example, an SCS in the numerology is used as a unit for both the offset and the frequency domain width.

(III) Determining of the Numerology of the PI Region

It can be learned based on the foregoing analysis that, both the time domain location and the frequency domain location of the PI region may be indicated by referring to a numerology. The numerology is referred to as the numerology of the PI region.

Considering that a plurality of eMBB UEs in the PI region may differ in numerology, a reference numerology needs to be determined for a group of UEs receiving a group common PI. The reference numerology may be predefined in a protocol; or the network device determines the reference numerology and then notifies the UE of the reference numerology by using signaling; or both the network device and the UE consider by default that the numerology of the PI region is the same as a numerology of a data channel or a control channel of the UE.

After the UE receives the PI, if the numerology of the PI region is different from a numerology used by the UE, neither a time-frequency location of the PI region nor a location that is of a preempted time-frequency resource and that is indicated by the PI can be determined based on the numerology of the UE. However, a time-frequency range of the PI region may be determined based on the numerology of the PI region, and a range of the preempted time-frequency resource may be further determined with reference to content indicated by the PI. For example, an SCS in the numerology of the PI region is of 60 kHz, the indicated preempted time-frequency location is 10 continuous resource blocks (RB) starting from a frequency A and four continuous symbols starting from a moment t, and UE 1 uses an SCS of 15 kHz. In this case, for the UE 1, the preempted time-frequency location is 40 RBs starting from the frequency A and one symbol starting from the moment t.

(IV) Discontinuous Time-Frequency Resources in the PI Region

Time-frequency resources in the PI region may be discontinuous. For example, some time-frequency resources are time-frequency resources that are dedicated for eMBB control information or service data and that cannot be preempted by URLLC service data. In this case, the PI region may not include the time-frequency resources that cannot be preempted.

Figure 4A:
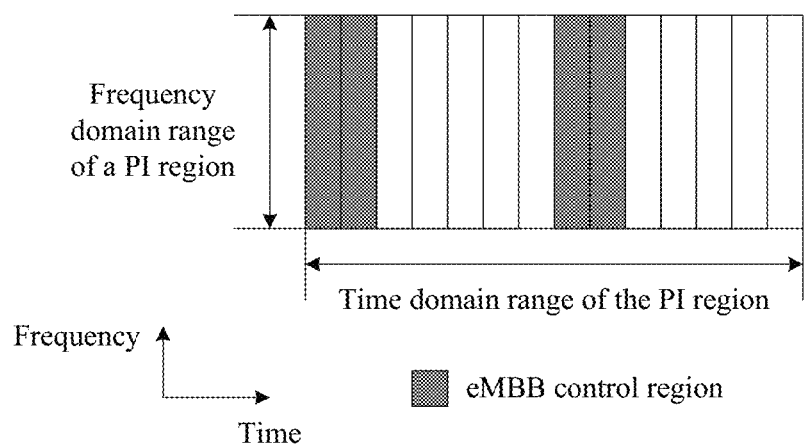
FIG. 4A is a schematic diagram of a scenario of discontinuous time-frequency resources in a PI region according to an embodiment of this application.

Specifically, as shown in FIG. 4A, it is assumed that the first two time domain symbols of a slot with seven time domain symbols are an eMBB control region that is used to transmit the eMBB control information and that cannot be preempted by the URLLC service data, and the time domain range of the PI region is two slots. In this case, 10 time domain symbols can be actually preempted in the PI region, and the 10 time domain symbols are discrete in time. It may be understood that, the resource that cannot be preempted in this application may alternatively be reserved for use in LTE or may be an interference management resource.

Figure 4B:
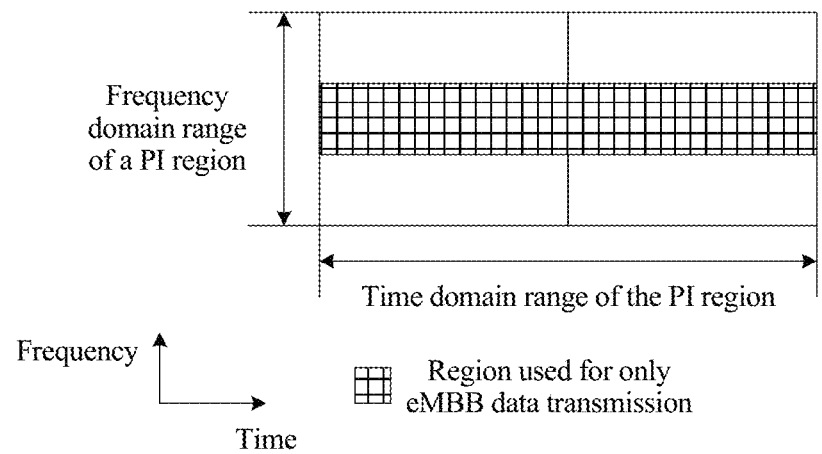
FIG. 4B is a schematic diagram of another scenario of discontinuous time-frequency resources in a PI region according to an embodiment of this application.

As shown in FIG. 4B, within a frequency domain range of the PI region, some frequency domain resources are configured to be used only for eMBB data transmission, and cannot be used for URLLC data transmission. In this case, the PI region may not include the frequency domain resources.

Figure 4C:
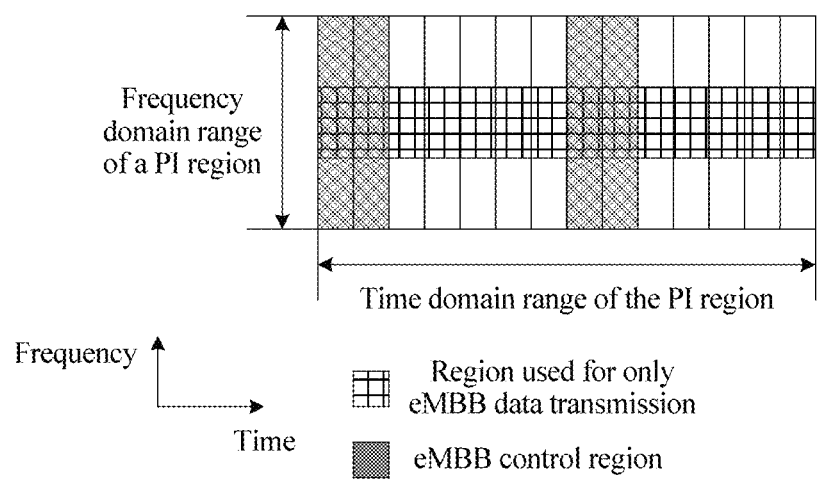
FIG. 4C is a schematic diagram of another scenario of discontinuous time-frequency resources in a PI region according to an embodiment of this application.
Figure 4D:
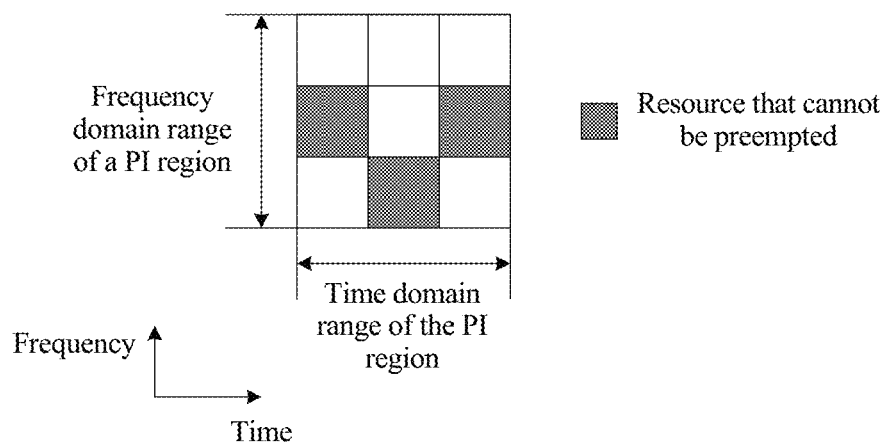
FIG. 4D is a schematic diagram of another scenario of discontinuous time-frequency resources in a PI region according to an embodiment of this application.

The foregoing two cases may be combined. As shown in FIG. 4C, the PI region includes both a region used only for eMBB data transmission and a region reserved for use by the eMBB control information. More generally, as shown in FIG. 4D, time-frequency resources that cannot be preempted are discretely distributed within a time-frequency region of the PI region.

When there is a time-frequency resource that cannot be preempted in the PI region, a PI region configured by the network device for the terminal device by using signaling or a PI region predefined in a system may be a segment of continuous time-frequency resources including the time-frequency resource that cannot be preempted. The terminal device may learn, based on a predefinition in the system, of the time-frequency resource that cannot be preempted. The terminal device may alternatively obtain, by using the signaling sent by the network device, the time-frequency resource that cannot be preempted.

When the time-frequency region of the PI region includes the time-frequency resource that cannot be preempted, the PI region is divided into sub-regions in two different processing manners: In one processing manner, the time-frequency resource that cannot be preempted is ignored, and continuous time-frequency resources corresponding to the PI region are segmented, to obtain a plurality of sub-regions. In the other processing manner, after the time-frequency resource that cannot be preempted is eliminated, a time-frequency resource that can be preempted in the PI region is segmented, to obtain a plurality of sub-regions. For example, in FIG. 4D, when the PI indicates whether a time-frequency resource is preempted, 9 bits may be used to respectively correspond to resources that can be preempted and resources that cannot be preempted in FIG. 4D, to indicate whether the time-frequency resource is preempted. In this case, 3 bits are redundant. In each bit, 1 indicates "preempted", and 0 indicates "not preempted"; or 1 indicates "not preempted", and 0 indicates "preempted". Alternatively, when the PI indicates whether a time-frequency resource is preempted, 6 bits may be used to respectively indicate whether resources that can be preempted in FIG. 4D are preempted. The terminal device may determine, based on a division status of a resource that can be preempted and a resource that cannot be preempted in the PI region, a quantity of bits included in a resource indication part in the PI. In the foregoing example, if a PI including a resource that cannot be preempted is used, 9 bits are used; or if a PI excluding a resource that cannot be preempted is used, 6 bits are used.

Specifically, an indication manner used by the PI and whether an indicated time-frequency resource includes a resource that cannot be preempted may be predefined in a system or may be notified by the network device to the terminal device by using signaling.

Herein, the time-frequency resource that cannot be preempted is a time-frequency resource that cannot be preempted for downlink data transmission. Specifically, the time-frequency resource that cannot be preempted may include at least one of the following time-frequency resources: a time-frequency resource used to transmit a PDCCH, an uplink symbol configured in a time division duplex (TDD) scenario, a gap symbol configured in the TDD scenario for switching from downlink transmission to uplink transmission, an unknown symbol configured in the TDD scenario, and a reserved resource configured in a system.

In the TDD scenario, the UE may obtain a slot configuration by using two types of signaling: One type is cell-specific signaling, for example, an RRC broadcast message and/or cell common DCI; and the other type is UE-specific signaling, for example, UE-specific RRC signaling and/or UE-specific DCI. The slot configuration herein may include a configuration of each symbol in a slot: whether the symbol is used for uplink transmission or downlink transmission, or the symbol is a GAP symbol, or the symbol is an unknown symbol. The UE-specific signaling can be received only by specific UE. Therefore, for the PI region, a UE-specific slot configuration cannot be used as a reference for defining the PI region. If the network device or the terminal device uses the UE-specific slot configuration as a reference for defining the PI region, for example, if an uplink symbol configured in the UE-specific signaling is excluded from the PI region, different UEs have different understandings of the PI region. Consequently, the network device cannot notify, by using common DCI, a location of a preempted resource in the PI region. Therefore, for the PI region, only a cell-specific slot configuration can be used as a reference for defining the PI region, and an uplink symbol configured in the cell-specific signaling may be excluded from the PI region, or a GAP symbol configured in the cell-specific signaling may be excluded from the PI region, or an unknown symbol configured in the cell-specific signaling may be excluded from the PI region.

It is assumed that there is the following configuration in the cell-specific signaling: In 14 symbols numbered 0 to 13 in a slot, 10 symbols numbered 0 to 4 and 7 to 11 are downlink symbols, symbols numbered 5 and 12 are GAP symbols, and symbols numbered 6 and 13 are uplink symbols. In this case, the network device and the terminal device may exclude the uplink symbols numbered 6 and 13 from the PI region, and may further exclude the GAP symbols numbered 5 and 12 from the PI region.

Embodiment 2: Design of a PI with a Fixed Bit Length

If a fixed PI bit length is used for different PI region sizes, a quantity of times UE blindly detects DCI can be reduced. Because the PI is carried by using DCI, when a bit length of the PI changes with a PI region, the UE needs to separately blindly detect DCI with different lengths, to determine whether a network device sends the PI. In this application, the PI region is also referred to as a first time-frequency resource. When content of DCI carried on a PDCCH includes only a PI, it may also be understood that the PI is carried by using the PDCCH. In this case, an equivalent replacement may be made between the PI and the DCI.

Method (I)

The PI includes a field A. The field A is used to indicate a preempted time-frequency resource B, and a length of the field A is fixed m bits. How the field A indicates the time-frequency resource B is described below.

(1) The PI region is segmented into m sub-regions, and the bits in the field A are in a one-to-one correspondence with the m sub-regions and are used to indicate whether information transmission in the sub-regions is affected, where m is a positive integer. In the field A, when a value of a bit is 1, it indicates that a corresponding sub-region is preempted, or when a value of a bit is 0, it indicates that a corresponding sub-region is not preempted; or when a value of a bit is 0, it indicates that a corresponding sub-region is preempted, or when a value of a bit is 1, it indicates that a corresponding sub-region is not preempted. When m is equal to 1, it indicates that 1 bit is used to indicate whether puncturing occurs in the PI region. For example, 1 indicates that the entire PI region is punctured, and 0 indicates that the entire PI region is not punctured; or 1 indicates that puncturing occurs in the PI region, and 0 indicates that no puncturing occurs. Certainly, meanings of 0 and 1 may be interchanged. Herein, that information transmission is affected includes that a transmission resource for the information transmission is preempted by other information transmission or the information transmission is interfered with by other information transmission. In this application, that information transmission is affected and that a transmission resource for the information transmission is preempted may be interchanged. The information transmission herein includes data transmission, signaling transmission, reference signal transmission, and the like.

(2) Specifically, the PI region may be segmented into the m sub-regions in the following segmentation method:

(2.1) Segmentation is performed only in time domain

It is assumed that there are n third time units in the PI region, where n is a positive integer, and the third time unit may be a time domain symbol, a mini-slot, a slot, a subframe, or a time unit with another time domain length. The PI region is divided into min(n, m) second time units in time domain, and each of the m bits is used to indicate whether information transmission on one second time unit in the PI region is affected, where min(n, m) indicates selecting a minimum value in n and m. The second time unit herein is the sub-region.

Specifically, when n is less than m, the PI region is divided into n second time units, and each second time unit corresponds to one third time unit. In the field A, n bits are used to indicate whether time-frequency resources of the n second time units are preempted. For example, the first n bits in the field A are used to indicate whether the time-frequency resources of the n second time units are preempted, and the last m-n bits in the field A are set to default values and have no specific meanings.

When n=k*m, the PI region is divided into m second time units, each second time unit corresponds to k third time units, and each of the m bits is used to indicate whether a time-frequency resource of one second time unit is preempted, where k is a positive integer.

When n=k*m+r, where k and r are positive integers, and r is less than m, the PI region is divided into m second time units, where m-r second time units correspond to k third time units, and r second time units correspond to k+1 third time units. For example, the first m-r second time units correspond to k third time units, the last r second time units correspond to k+1 third time units; or the first r second time units correspond to k+1 third time units, and the last m-r second time units correspond to k third time units. Each of the m bits is used to indicate whether a time-frequency resource of one second time unit is preempted.

(2.2) Segmentation is performed only in frequency domain

This is similar to the solution of performing segmentation only in time domain, and details are not described herein.

(2.3) Segmentation is performed in both time domain and frequency domain, that is, the PI region is divided into the m sub-regions in both a time dimension and a frequency dimension. The sub-region herein is also referred to as a second time-frequency resource.

It is assumed that the PI region includes f frequency domain units and n third time units. The frequency domain unit herein may be a subcarrier, an RB, an RB group, or another frequency domain unit consisting of at least two RBs, and both f and n are positive integers. In this case, the PI region includes f*n time-frequency units, and each time-frequency unit corresponds to a frequency domain unit on one third time unit. The time-frequency units in the PI region may be numbered in a sequence. The numbering may be performed first in time domain and then in frequency domain or may be performed first in frequency domain and then in time domain. This is not limited in this application.

When f*n is less than m, each of f*n sub-regions corresponds to one time-frequency unit. For example, each of the first f*n sub-regions correspond to one time-frequency unit, the first f*n bits in the field A are used to indicate whether information transmission on the f*n time-frequency units is affected, and the last m−f*n bits in the field A are set to default values and have no specific meanings.

When f*n=k*m, each of the m sub-regions corresponds to k time-frequency units, where k is a positive integer.

When f*n=k*m+r, where k and r are positive integers, and r is less than m, in the m sub-regions, m−r sub-regions correspond to k time-frequency units, and r sub-regions correspond to k+1 time-frequency units. For example, the first m−r sub-regions in the m sub-regions correspond to k time-frequency units, and the last r sub-regions in the m sub-regions correspond to k+1 time-frequency units; or the first r sub-regions in the m sub-regions correspond to k+1 time-frequency units, and the last m−r sub-regions in the m sub-regions correspond to k time-frequency units.

In a possible implementation, a mapping relationship between a time domain length of a PI region and a time domain segmentation granularity of the PI region shown in Table 1 is predefined in a system. A symbol in this application is a time domain symbol, and may be an orthogonal frequency division multiplexing (OFDM) symbol or a discrete Fourier transform spread orthogonal frequency division multiplexing (DFT-s-OFDM) symbol.

TABLE 1

| Time domain length of the PI region | Time domain segmentation granularity of the PI region |
|---|---|
| Seven symbols (one slot) | One symbol, two symbols |
| 14 symbols (two slots) | Two symbols, seven symbols |

Because the field A and the PI have fixed bit lengths, for a PI region of a fixed size, if the PI region is divided finely in frequency domain, the PI region is divided coarsely in time domain; and on the contrary, if the PI region is divided coarsely in frequency domain, the PI region is divided relatively finely in time domain.

Because the PI region may be segmented into the m sub-regions by using a plurality of different segmentation methods, a policy is required for further determining a to-be-used segmentation method, so that the network device and the UE have a consistent understanding of the segmentation method. In a possible policy, a rule A is predefined in a system to determine a segmentation method, so that the network device and the UE have a consistent understanding of the segmentation method. In another possible policy, the network device determines a segmentation method according to a rule B, and then notifies the UE of the segmentation method by using signaling, so that the network device and the UE have a consistent understanding of the segment method. The signaling herein may be RRC signaling, MAC layer signaling, or physical layer signaling. Factors considered in the rule A and the rule B may include at least one of a frequency domain width of the PI region, a frequency domain segmentation granularity (that is, the foregoing frequency domain unit) of the PI region, the time domain length of the PI region, the time domain segmentation granularity (that is, the foregoing third time unit) of the PI region, and a time-frequency region size of the PI region.

For example, when the time domain length of the PI region is greater than a threshold A, the segmentation method in which segmentation is performed only in time domain is selected; or when the time domain length of the PI region is less than or equal to a threshold A, the segmentation method in which segmentation is performed in both time domain and frequency domain is selected.

For another example, when the time-frequency region size of the PI region is less than a threshold B, the method in which segmentation is performed in both time domain and frequency domain is selected, and a relatively small time domain segmentation granularity B and frequency domain segmentation granularity B are selected; or when the time-frequency region size of the PI region is greater than or equal to a threshold B and less than a threshold C, the method in which segmentation is performed in both time domain and frequency domain is selected, and a medium time domain segmentation granularity C and frequency domain segmentation granularity C are selected; or when the time-frequency region size of the PI region is greater than or equal to a threshold C, the method in which segmentation is performed in both time domain and frequency domain is selected, and a relatively large time domain segmentation granularity D and frequency domain segmentation granularity D are selected. Because the time-frequency region size of the PI region may be obtained based on the time domain length and the frequency domain width of the PI region, the segmentation method may also be determined based on both values of the time domain length and the frequency domain width of the PI region.

Table 2 is a table of possible selection policies for selecting the segmentation method based on the frequency domain width of the PI region and the time domain length of the PI region. A value in each cell in Table 2 is merely an example, and a specific consideration factor and selection policy may be designed according to an actual requirement, and are not limited in this application. In this application, during specific implementation, a table may be in a form of a table, or may be implemented by using a branch selection and judgment statement similar to "if else", "switch case", or the like in the programming language C language. This solution of flexibly selecting a segmentation method according to an actual requirement may flexibly adapt to various possible scenarios, to maximize PI indication efficiency.

TABLE 2

| Configuration number | Frequency domain width of the PI region | Time domain length of the PI region | Segmentation method |
|---|---|---|---|
| 1 | F1 | T1 | 1 |
| 2 | F2 | T2 | 2 |
| 3 | F3 | T3 | 3 |

(2.4) Independent segmentation is performed in time domain and frequency domain

It is assumed that the PI region includes f frequency domain units and n third time units. The network device and/or the terminal device divide/divides the n third time units in the PI region into m1 second time units, where m1 is a positive integer; and divides the f frequency domain units in the PI region into n1 second frequency domain units, where n1 is a positive integer. The PI region is divided into m1*n1 second time-frequency units, where each second time-frequency unit corresponds to a second frequency domain unit on one second time unit.

For example, the PI region includes 14 symbols and 100 RBs, the PI region is divided into seven second time units in time domain and each second time unit corresponds to two symbols, and the PI region is divided into two second frequency domain units in frequency domain and each second frequency domain unit corresponds to 50 RBs. The PI region is divided into 14 second time-frequency units, and each second time-frequency unit corresponds to 50 RBs on two symbols.

Specifically, how the network device and/or the terminal device divide/divides the n third time units in the PI region into the m1 second time units may be directly obtained by referring to related descriptions in (2.1). How the network device and/or the terminal device divide/divides the f frequency domain units in the PI region into the n1 second frequency domain units may be directly obtained by referring to related descriptions in (2.2).

The field A with the length of m bits is used to indicate whether the m1*n1 second time-frequency units are preempted. A specific indication method is as follows:

When m=m1*n1, each bit in the field A is used to indicate whether one second time-frequency unit is preempted.

When m<(m1*n1), it may be indicated that m1*n1=q1*m+q2, where q1 and q2 are positive integers, and q2 is less than m. All of m-q2 bits in the field A are respectively used to indicate whether q1 second time-frequency units are preempted, and all of q2 bits in the field A are respectively used to indicate whether q1+1 second time-frequency units are preempted. For example, all of the first m-q2 bits in the field A are respectively used to indicate whether q1 second time-frequency units are preempted, and all of the last q2 bits in the field A are respectively used to indicate whether q1+1 second time-frequency units are preempted; or all of the last m-q2 bits in the field A are respectively used to indicate whether q1 second time-frequency units are preempted, and all of the first q2 bits in the field A are respectively used to indicate whether q1+1 second time-frequency units are preempted.

When m>(m1*n1), m1*n1 bits in the field A are used to indicate whether the m1*n1 second time-frequency units are preempted. For example, each of the first m1*n1 bits in the field A is used to indicate whether one of the m1*n1 second time-frequency units is preempted, and the last m-(m1*n1) bits in the field A may be set to default values and have no specific meanings; or each of the last m1*n1 bits in the field A is used to indicate whether one of the m1*n1 second time-frequency units is preempted, and the first m-(m1*n1) bits in the field A may be set to default values and have no specific meanings.

The m1*n1 second time-frequency units may be numbered first in time domain and then in frequency domain or first in frequency domain and then in time domain. An example in which the PI region is divided into seven second time units in time domain and divided into two second frequency domain units in frequency domain is used for description. Numbers of the second frequency domain units, the second time units, and the second time-frequency units may start from 0 or 1. Herein, an example in which numbering is performed starting from 0 is used for description. When the second time-frequency units are numbered first in frequency domain and then in time domain, a second time unit numbered 0 corresponds to two second time-frequency units numbered 0 and 1, a second time unit numbered 1 corresponds to two second time-frequency units numbered 2 and 3, and the rest may be deduced by analogy. The second time-frequency unit numbered 0 may correspond to a second time-frequency unit with a large frequency value, or may correspond to a second time-frequency unit with a small frequency value. This is not limited in this application. When the second time-frequency units are numbered first in time domain and then in frequency domain, a second frequency domain unit numbered 0 corresponds to seven second time-frequency units numbered 0 to 6, and a second frequency domain unit numbered 1 corresponds to seven second time-frequency units numbered 7 to 13. The second frequency domain unit numbered 0 may correspond to a second frequency domain unit with a large frequency value, or may correspond to a second frequency domain unit with a small frequency value. This is not limited in this application.

Method (II)

To improve preemption indication precision and reduce a probability that the terminal device discards useful data due to low preemption indication precision, a sub-region in which preemption occurs may be first indicated in the PI, and then the sub-region is further segmented to obtain a plurality of mini-regions, and preempted mini-regions in the sub-region are indicated.

Specifically, the PI includes a field B, used to indicate a preempted sub-region. The field B may also be referred to as an indication field. For details about how to segment the PI region into a plurality of sub-regions, refer to related descriptions in Method (I). For example, the PI region is segmented into 16 sub-regions, where if a part or all of a time-frequency resource in the sixth sub-region is preempted, a value of the indication field is 6. It should be noted that, in this application, values of various numbers are related to a specific numbering method. For example, the numbers may start from 0 or 1. If the numbers starts from 1, a number of the sixth sub-region is 6; or if the numbers starts from 0, a number of the sixth sub-region is 5. Correspondingly, when a part or all of the time-frequency resource in the sixth sub-region is preempted, a value of the indication field may be 5 or 6, which specifically depends on a numbering method. This is not limited in this application. The sub-region indicated by the field B may also be referred to as a target sub-region.

Optionally, the PI may further include a field C and a field D. The field C is used to indicate a segmentation method in the target sub-region, and the field D is used to indicate preempted mini-regions in the sub-region. The field C may also be referred to as an option field. The field D may indicate the preempted mini-regions by using a bitmap with a length of L bits, where L is a positive integer.

Figure 4E:
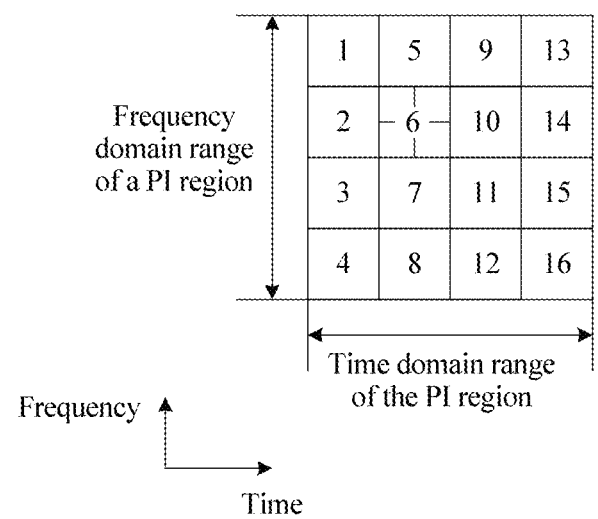
FIG. 4E is a schematic diagram of determining a PI region segmentation method according to an embodiment of this application.

FIG. 4E shows a PI region segmentation method according to an embodiment of this application. As shown in FIG. 4E, the PI region is divided into 16 sub-regions, where a part of or all of a time-frequency resource in the sixth sub-region is preempted. In this case, the field B in the PI is used to indicate that the sixth sub-region is preempted, the field C is used to indicate that the sixth sub-region is segmented in a 2*2 manner to obtain four mini-regions, and the field D indicates, by using 4 bits, preempted mini-regions in the four mini-regions in the sixth sub-region. In this application, a P*Q segmentation manner means that a to-be-segmented region is divided into P parts in time domain and divided into Q parts in frequency domain, where P and Q are positive integers.

Table 2A is an example of bit lengths of the field B, the field C, and the field D, where the field B and the field C each are of 2 bits, and the field D is of 14 bits. The field C of 2 bits is used to indicate one of the following four segmentation manners: 2*7, 7*2, 3*4, and 4*3.

TABLE 2A

| Length of the field B (indication field) | Length of the field C (option field) | Length of the field D |
|---|---|---|
| 2 bits | 2 bits | 14 bits |

When the bit length L of the field D is equal to a quantity of mini-regions in the target sub-region, that is, L=P*Q, the bits in the field D are in a one-to-one correspondence with the mini-regions in the target sub-region. For example, when the field C indicates that a 2*7 or 7*2 segmentation manner is used, the 14 bits in the field D are in a one-to-one correspondence with 14 mini-regions in the target sub-region.

When the bit length L of the field D is greater than a quantity of mini-regions in the target sub-region, that is, L>P*Q, the first P*Q bits or the last P*Q bits in the field D are in a one-to-one correspondence with P*Q mini-regions in the target sub-region. For example, when the field C indicates that a 3*4 or 4*3 segmentation manner is used, the first 12 bits or the last 12 bits in the field D are in a one-to-one correspondence with 12 mini-regions in the target sub-region, and the remaining 2 bits are used as reserved bits.

When the bit length L of the field D is less than a quantity of mini-regions in the target sub-region, that is, L<P*Q, some of P*Q mini-regions share 1 bit in the field D for indication. Specifically, it is assumed that P*Q=u*L+v, where u is a positive integer, and v is an integer greater than or equal to 0. In this case, every u+1 mini-regions in v*(u+1) mini-regions in the target sub-region correspond to 1 bit in the field D, and every u mini-regions in the remaining mini-regions correspond to 1 bit in the field D. For example, when the field C indicates that a 3*5 or 5*3 segmentation manner is used, the first nine mini-regions in the target sub-region each correspond to 1 bit in the field D, and every two mini-regions in the last six mini-regions in the target sub-region correspond to 1 bit in the field D.

The bit lengths of the field B, the field C, and the field D are all fixed, so that after receiving the PI, the terminal device may separately obtain values of the three fields through parsing. In some scenarios, the lengths of the field B, the field C, and the field D may alternatively dynamically change based on an actual application scenario, to maximize PI indication precision, thereby reducing an amount of effective data discarded by the terminal device after the terminal device receives the PI, and improving a data transmission rate.

Optionally, the PI may further include a field E, used to indicate a PI format. The PI format may include: whether the field B exists and the bit length of the field B; whether the field C exists and the bit length of the field C; and the bit length of the field D. Specifically, the field E may be used to dynamically indicate the bit lengths of the field B, the field C, and the field D. The field E may also be referred to as a format indication field. To reduce a quantity of times the terminal device blindly detects the PDCCH, a total length of the field B, the field C, the field D, and the field E may be a fixed value. As shown in Table 2B, the total length of the field B, the field C, the field D, and the field E is 23 bits, where a length of the field E is 2 bits, and a sum of the lengths of the field B, the field C, and the field D is 21 bits. When a value of the field E is 0, the PI includes the field D but includes neither the field B nor the field C; and in this case, the length of the field D is 21 bits and the field D is used to indicate whether a resource in the sub-region in the PI region is preempted. When a value of the field E is 1, the PI includes the field B and the field D but does not include the field C; and the length of the field B is 2 bits, and the length of the field D is 19 bits. When a value of the field E is 2, the PI includes the field C and the field D; the length of the field C is 2 bits, and the length of the field D is 19 bits; and in this case, the field C indicates a segmentation manner of segmenting the PI region into the sub-regions, and the field D is used to indicate whether a resource in the sub-region in the PI region is preempted. When a value of the field E is 3, the PI includes the field B, the field C, and the field D; and the length of the field B is 2 bits, the length of the field C is 2 bits, and the length of the field D is 17 bits.

TABLE 2B

| Value of the field E (format indication field) | Length of the field B (indication field) (bit quantity) | Length of the field C (option field) (bit quantity) | Length of the field D (bit quantity) |
|---|---|---|---|
| 0 | 0 | 0 | 21 |
| 1 | 2 | 0 | 19 |
| 2 | 0 | 2 | 19 |
| 3 | 2 | 2 | 17 |

Optionally, PI formats may be distinguished by using different radio network temporary identifiers (RNTI), that is, a cyclic redundancy code (CRC) of DCI is scrambled by using different RNTIs, where the DCI includes the PI. According to the method, a payload of the PI can be reduced by 2 bits without changing the indication precision, or a quantity of bits used to effectively indicate a preempted region is increased by 2 bits, to improve the PI indication precision. As shown in Table 2C, an RNTI 0, an RNTI 1, an RNTI 2, and an RNTI 3 respectively indicate PIs in different formats, that is, indicate different values of the lengths of the field B, the field C, and the field D.

TABLE 2C

| RNTI | Length of the field B (indication field) (bit quantity) | Length of the field C (option field) (bit quantity) | Length of the field D (bit quantity) |
|---|---|---|---|
| RNTI 0 | 0 | 0 | 21 |
| RNTI 1 | 2 | 0 | 19 |

TABLE 2C-continued

| RNTI | Length of the field B (indication field) (bit quantity) | Length of the field C (option field) (bit quantity) | Length of the field D (bit quantity) |
| --- | --- | --- | --- |
| RNTI 2 | 0 | 2 | 19 |
| RNTI 3 | 2 | 2 | 17 |

It may be understood that, alternatively, the PI format may be indicated by using a time-frequency location for carrying the PI, or the PI format may be semi-statically indicated by RRC signaling.

Optionally, the DCI may include W PIs, where W is a positive integer. Each PI includes a field B, a field C, a field D, and a field E, where the field B and the field C are optional. Each PI is used to indicate whether data transmission of one terminal device or one group of terminal devices is preempted. Herein, terminal devices may be grouped based on bandwidth parts (BWP) of the terminal devices. For example, terminal devices for which a same BWP is configured are put into one group. A value of W may be configured for the terminal device by the network device by using RRC signaling.

Embodiment 3: Design of a PI with a Changing Bit Length

If a quantity of bits in a field A is dynamically determined based on a size of a PI region, a preempted time-frequency resource B can be more effectively indicated. For example, when the PI region is relatively small, a relatively small quantity of bits may be selected, to reduce PI overheads. When the PI region is relatively large, a relatively large quantity of bits may be selected, so that an indicated granularity is smaller and the preempted time-frequency resource can be more precisely indicated, to avoid a case in which UE receiving the preemption indication discards data on a large time-frequency resource due to preemption of only a small time-frequency resource, thereby effectively improving data transmission efficiency.

Specifically, a set of PI formats may be defined as follows: A={PI1, PI2, PI3, . . . , PIj}, and a network device and the UE may dynamically select a PI format from the set A based on the size of the PI region as a currently used PI format. A larger PI region indicates a larger bit length of a field A in a selected PI. Different PI formats correspond to different DCI formats.

For example, the set A={PI1, PI2}, where a field A in the PI1 has 7 bits, and a field A in the PI2 has 14 bits. When a time domain size of the PI region is one slot, the format PI1 is used; or when a time domain size of the PI region is two slots, the format PI2 is used.

For another example, the set A={PI1, PI2, PI3}, where a field A in the PI1 has 7 bits, a field A in the PI2 has 14 bits, and a field A in the PI3 has 21 bits. When a quantity of time-frequency units in the PI region is less than or equal to RB1, the format PI1 is used; or when a quantity of time-frequency units in the PI region is greater than RB2, the format PI3 is used; or when a quantity of time-frequency units in the PI region is greater than RB1 and less than or equal to RB2, the format PI2 is used. For a definition of the time-frequency unit herein, refer to Embodiment 2 of this application. RB1 and RB2 are both positive integers and are thresholds for the quantity of time-frequency units, and RB1 is less than RB2.

The network device and the UE may alternatively determine the PI format based on a PI monitoring period of the UE. For example, a longer PI monitoring period indicates a larger bit length of a field A in a selected PI.

A policy for the PI format determining may be as follows. A rule C is predefined in a system, and the PI format is determined according to the rule. Both the network device and the UE can obtain an input parameter of the rule, so that both the network device and the UE can determine the PI format according to the rule C, to have a consistent understanding of the PI format. Another possible policy is as follows. The network device determines the PI format according to a rule D, and then notifies the UE of the PI format by using signaling, so that the network device and the UE have a consistent understanding of the PI format. The signaling herein may be RRC signaling, MAC layer signaling, or physical layer signaling. Factors considered in the rule C and the rule D may include at least one of a frequency domain width of the PI region, a frequency domain segmentation granularity (that is, the foregoing frequency domain unit) of the PI region, a time domain length of the PI region, a time domain segmentation granularity (that is, the foregoing third time unit) of the PI region, the PI monitoring period, a PI sending period, a numerology, and a time-frequency region size of the PI region.

Table 3 is a table of possible selection policies for selecting the PI format based on the frequency domain width of the PI region, the time domain length of the PI region, and the numerology. A value in each cell in Table 3 is merely an example, and a specific consideration factor and selection policy may be designed according to an actual requirement, and are not limited in this application. This solution of flexibly selecting a PI format according to an actual requirement may flexibly adapt to various possible scenarios, to reach a better compromise between PI indication efficiency and PI indication overheads.

TABLE 3

| Configuration number | Frequency domain width of the PI region | Time domain length of the PI region | numerology | PI format |
| --- | --- | --- | --- | --- |
| 1 | F1 | T1 | 1 | 1 |
| 2 | F2 | T2 | 2 | 2 |
| 3 | F3 | T3 | 3 | 3 |

It may be understood that, a set of DCI formats may alternatively be defined as follows: B={DCI1, DCI2, DCI3, . . . DCIk}, and a currently used DCI format is selected from the set B according to a method similar to the foregoing method. Details are not described herein.

After the PI format is determined, for how to segment the PI region to obtain m sub-regions, refer to Embodiment 2.

Embodiment 4: Design of a PI with a Fixed Granularity in Frequency Domain

A PI region is segmented based on a fixed granularity, for example, is segmented based on a granularity of resource block groups (RBG), in frequency domain. The PI indicates, in frequency domain, whether each sub-region obtained after the segmentation is preempted. Optionally, a size of the RBG may be determined based on a frequency domain width of the PI region. For example, when the frequency domain width of the PI region is less than 10 megahertz (MHz), the RBG may be two resource blocks (RB); or when the frequency domain width of the PI region is greater than 10 MHz and less than 20 MHz, the RBG may be four RBs.

It is assumed that an RBG includes p RBs, the frequency domain width of the PI region is N RBs, N=pk+r, and r<p, where p and N are positive integers, and r and k are integers greater than or equal to 0. After the PI region is divided in frequency domain, in the PI region, k sub-regions include p RBs, and one sub-region includes r RBs; or k−1 sub-regions include p RBs, and one sub-region includes p+r RBs. The PI region may also be segmented in time domain in a similar manner, and a fixed time domain granularity is x symbols. A specific segmentation process is the same as the foregoing segmentation process in frequency domain, and details are not described herein.

In all the foregoing embodiments, all processing of the PI region in frequency domain is performed by using the numerology of the PI region as reference.

Figure 5:
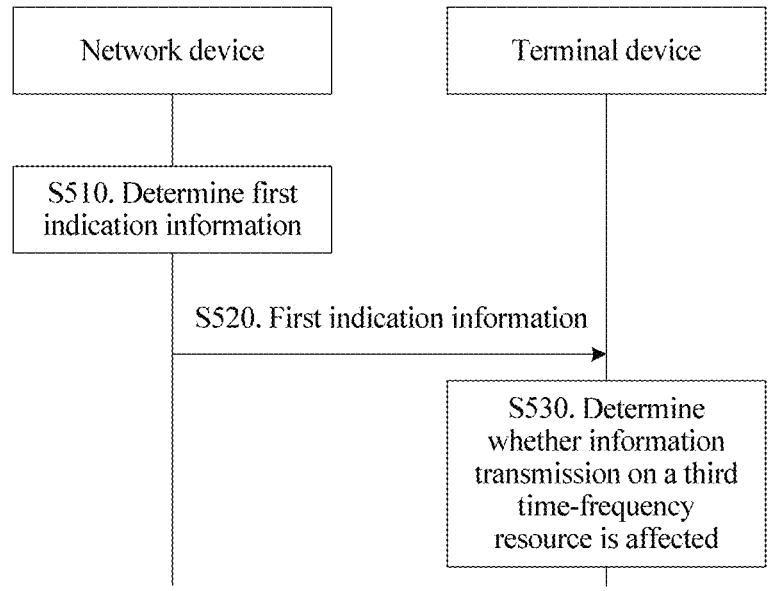
FIG. 5 is a schematic diagram of a control information transmission method according to an embodiment of this application.

FIG. 5 shows a control information transmission method according to Embodiment 5 of this application. The method includes the following steps.

S510. A network device determines first indication information, where the first indication information is used to indicate whether information transmission on a first time-frequency resource is affected. It may be understood that, content of the first indication information is determined based on a scheduling result obtained before the first indication information is sent.

Specifically, the first indication information is the foregoing indication information for assisting in reception, and the first time-frequency resource is the foregoing PI region.

Optionally, a time domain location and a frequency domain location of the first time-frequency resource are predefined in a system or predefined in a protocol.

Optionally, the network device sends first control information, where the first control information includes frequency domain location information of the first time-frequency resource; and a time domain location of the first time-frequency resource is predefined in a system or predefined in a protocol. In a possible implementation, the frequency domain location information that is of the first time-frequency resource and that is included in the first control information is determined based on a frequency domain location at which eMBB UE and URLLC UE coexist. The first control information may be transmitted by using one or more of RRC signaling, physical layer signaling, or MAC layer signaling.

Optionally, the network device sends first control information, where the first control information includes time domain location information of the first time-frequency resource; and frequency domain location information of the first time-frequency resource is predefined in a system or predefined in a protocol.

Optionally, the network device sends first control information, where the first control information includes time domain location information and frequency domain location information of the first time-frequency resource.

Optionally, the frequency domain location information of the first time-frequency resource includes start location offset information and frequency domain width information. The frequency domain location information of the first time-frequency resource may further include reference point information of the frequency domain location. The frequency domain location of the first time-frequency resource is determined based on all of a reference point of the frequency domain location, a start location offset, and a frequency domain width. The reference point of the frequency domain location may be predetermined in a system or a protocol, or may be sent by the network device to UE by using the first control information.

Correspondingly, the terminal device receives the first control information.

Specifically, for a method for determining the time domain location information of the first time-frequency resource, refer to Embodiment 1. For a system predefinition or protocol predefinition manner, values of three variables X, Y, and T in Embodiment 1 are predefined, or values of two variables X and Y are predefined. For a signaling notification manner, the first control information includes value information of three variables X, Y, and T, or the first control information includes value information of two variables X and Y, or the first control information includes value information of a variable X or Y, where a value of a variable that is in X, Y, and T and that is not included in the first control information is predefined in a system or predefined in a protocol.

Specifically, for a method for determining the frequency domain location information of the first time-frequency resource, refer to Embodiment 1. For a system predefinition or protocol predefinition manner, the reference point of the frequency domain location, the start location offset, and the frequency domain width in Embodiment 1 may be predefined. For a signaling notification manner, the first control information includes information about the reference point of the frequency domain location, the start offset, and the frequency domain width, or the first control information includes one or two of the reference point information of the frequency domain location, the start location offset information, and the frequency domain width information, where information that is not included in the first control information is predefined in a system or predefined in a protocol.

A time-frequency resource used to transmit eMBB service data is occupied in two types of different manners. One type is a preemption manner, and the other type is a rate matching manner. Therefore, the network device needs to explicitly or implicitly notify the terminal device of a time-frequency resource occupation manner. The terminal device may perform different processing based on different time-frequency resource occupation manners. For the preemption manner, the terminal device directly discards data on an occupied time-frequency resource, where the discarded data does not participate in decoding or HARQ combination; and determines, based on a time-frequency resource used for data transmission, a location of each code block (CB) on the time-frequency resource, and further performs rate de-matching and decoding processing. For the rate matching manner, the terminal device directly discards data on an occupied time-frequency resource, where the discarded data does not participate in decoding or HARQ combination; and the terminal device determines, based on the occupied time-frequency resource and a time-frequency resource used for data transmission, a location of each CB on the time-frequency resource, and further performs rate de-matching and decoding processing. Based on the explicit or implicit indication, the terminal device may correctly determine the location of each CB on the time-frequency resource, to ensure that the network device and the terminal device have a consistent understanding of a manner of mapping data to the time-frequency resource, thereby ensuring that received data can be correctly decoded.

In a first possible implementation, the first indication information includes a first field, and the first field is used to indicate a manner in which the information transmission on the first time-frequency resource is affected, that is, a manner in which a time-frequency resource in the first time-frequency resource is occupied: the preemption manner or the rate matching manner. Optionally, a length of the first field may be 1 bit. When a value of the first field is 1, the first field indicates the preemption manner, or when a value of the first field is 0, the first field indicates the rate matching manner; or when a value of the first field is 0, the first field indicates the preemption manner, or when a value of the first field is 1, the first field indicates the rate matching manner.

In a second possible implementation, the first indication information includes a second field, and the second field is used to indicate a type of a resource that occupies a time-frequency resource in the first time-frequency resource. For example, 0 may be used to indicate a URLLC service, 1 may be used to indicate a reserved resource, and 2 may be used to indicate an interference management resource. Further, each resource type may correspond to one time-frequency resource occupation manner. For example, the URLLC service corresponds to the preemption manner, and both the reserved resource and the interference management resource correspond to the rate matching manner. After obtaining the second field, the terminal device can obtain a resource occupation manner.

In a third possible implementation, the first indication information includes a first field and a second field. In this case, there is no binding relationship between a resource type and a time-frequency resource occupation manner.

In a fourth possible implementation, a correspondence between a control resource set (CORESET) and a time-frequency resource occupation manner is defined, to implicitly notify the time-frequency resource occupation manner. For example, if the first indication information is sent on a CORESET 1, it indicates that a time-frequency resource is occupied in the preemption manner; or if the first indication information is sent on a CORESET 2, it indicates that a time-frequency resource is occupied in the rate matching manner. There may be a plurality of CORESETs 1 and CORESETs 2 that satisfy the foregoing mapping relationship.

In a fifth possible implementation, a correspondence between a radio network temporary identifier (RNTI) and a time-frequency resource occupation manner is defined, to implicitly notify the time-frequency resource occupation manner. For example, if the first indication information is scrambled by using an RNTI 1, it indicates that a time-frequency resource is occupied in the preemption manner; or if the first indication information is scrambled by using an RNTI 2, it indicates that a time-frequency resource is occupied in the rate matching manner. There may be a plurality of RNTIs 1 and RNTIs 2 that satisfy the foregoing mapping relationship.

In a sixth possible implementation, a correspondence between a payload size of the first indication information and a time-frequency resource occupation manner is defined, to implicitly notify the time-frequency resource occupation manner. For example, if the payload size of the first indication information is p1, it indicates that a time-frequency resource is occupied in the preemption manner; or if the payload size of the first indication information is p2, it indicates that a time-frequency resource is occupied in the rate matching manner. There may be a plurality of types of p1 and p2 that satisfy the foregoing mapping relationship.

In a seventh possible implementation, the time-frequency resource occupation manner is determined based on a time domain location for sending the first indication information. For example, if the time domain location for sending the first indication information is in front of the first time-frequency resource, it may indicate that a time-frequency resource is occupied in the rate matching manner; or if the time domain location for sending the first indication information is behind the first time-frequency resource, it may indicate that a time-frequency resource is occupied in the preemption manner; or if the time domain location for sending the first indication information falls within the first time-frequency resource, when the first indication information is sent on the first n time domain symbols, it may indicate that a time-frequency resource is occupied in the rate matching manner, or when the first indication information is sent on the last m time domain symbols, it may indicate that a time-frequency resource is occupied in the preemption manner.

In an eighth possible implementation, different resource regions are preconfigured, and the time-frequency resource occupation manner is determined based on different locations of the first time-frequency resource or an affected time-frequency resource indicated by the first indication information. For example, a coexistence region of URLLC and eMBB is preconfigured as B1, a region reserved for use in LTE is preconfigured as B2, and a resource region used for interference management is preconfigured as B3. In this case, when finding that the first time-frequency resource is located in B1, the terminal device considers that a time-frequency resource is occupied in the preemption manner; or when finding that the first time-frequency resource is located in B2 or B3, the terminal device considers that a time-frequency resource is occupied in the rate matching manner. Alternatively, when finding that the affected time-frequency resource indicated by the first indication information is located in B1, the terminal device considers that a time-frequency resource is occupied in the preemption manner; or when finding that the affected time-frequency resource indicated by the first indication information is located in B2 or B3, the terminal device considers that a time-frequency resource is occupied in the rate matching manner.

S520. The network device sends the first indication information through a PDCCH. Optionally, the network device sends the first indication information through the PDCCH on an $N^{th}$ first time unit. Correspondingly, the terminal device receives the first indication information.

The first time unit herein may be a time domain length in a numerology, and may be a time domain symbol, a mini-slot, a slot, a subframe, or the like in the numerology. The numerology herein may be the same as or different from a numerology used for data transmission. Optionally, a length of the first time unit is equal to a time domain length of the first time-frequency resource.

Optionally, the first indication information includes second indication information with a length of m bits, where m is an integer greater than 1, each bit in the second indication information is used to indicate whether information transmission on one second time unit in the first time-frequency resource is affected, and a time domain length of the second time unit is less than or equal to the time domain length of the first time-frequency resource. The second indication information herein corresponds to the field A in Embodiment 2. For a detailed definition of the second time unit, refer to Embodiment 2.

Optionally, the first indication information includes second indication information with a length of m bits, and each bit in the second indication information is used to indicate whether information transmission on one second time-frequency resource in the first time-frequency resource is affected, where m is an integer greater than 1, and a frequency domain width of the second time-frequency resource is less than or equal to the frequency domain width of the first time-frequency resource. For the second time-frequency resource herein, refer to the definition of the second time-frequency resource in Embodiment 2.

It may be understood that the network device may send the first indication information when a sending occasion of the first indication information arrives. The sending occasion may be determined based on a sending period. For example, assuming that the sending period of the first indication information is four slots, the network device may send the first indication information once every four slots. The first indication information is used to indicate whether there is an affected time-frequency resource and indicate a specific affected time-frequency resource. Alternatively, when the sending occasion of the first indication information arrives, the network device may first determine whether there is an affected time-frequency resource used for information transmission in the PI region. Herein, "affected" includes "preempted". If there is an affected time-frequency resource in the PI region, the first indication information is sent, to indicate a specific affected time-frequency resource.

It may be understood that, the sending occasion of sending the first indication information by the network device may be determined based on both the sending period and a sending offset. For example, the sending period is T first time units, a reference basis of the sending offset may be a start location of a time unit such as a radio frame, a subframe, or a slot, and the sending offset may be K first time units. A receiving occasion of receiving the first indication information by the terminal device is the same as the sending occasion of sending the first indication information by the network device, and the receiving occasion of receiving the first indication information by the terminal device may also be referred to as a monitoring occasion or a detection occasion.

The terminal device may monitor the first indication information when the monitoring occasion of the first indication information arrives. The monitoring occasion is determined based on a monitoring period. For example, assuming that the monitoring period of the first indication information is four slots, the terminal device may monitor the first indication information once every four slots, to determine whether the network device sends the first indication information. If the network device sends the first indication information, the terminal device demodulates and decodes the first indication information.

Alternatively, when the monitoring occasion of the first indication information arrives, the terminal device may determine whether there is data or control information to be sent to the terminal device on the first time-frequency resource corresponding to the monitoring occasion of the first indication information, and monitor the first indication information if there is data or control information to be sent to the terminal device on the first time-frequency resource, to determine whether the network device sends the first indication information. Considering that the first time-frequency resource may include a time-frequency resource that cannot be preempted, when the monitoring occasion of the first indication information arrives, the terminal device may determine whether there is data or control information to be sent to the terminal device on a time-frequency resource that is obtained after the time-frequency resource that cannot be preempted is eliminated from the first time-frequency resource. The time-frequency resource that cannot be preempted may be a reserved time-frequency resource. The reserved time-frequency resource herein may be used for forward compatibility or backward compatibility, or may be used to send an RS or the like. If there is data or control information to be sent to the terminal device on the time-frequency resource that is obtained after the time-frequency resource that cannot be preempted is eliminated from the first time-frequency resource, the terminal device monitors the first indication information, to determine whether the network device sends the first indication information. If the network device sends the first indication information, the terminal device demodulates and decodes the first indication information. The control information herein includes reference information or a reference signal. The first time-frequency resource corresponding to the monitoring occasion of the first indication information may be obtained by referring to Embodiment 1. For example, assuming that the monitoring occasion of the first indication information is an $N^{th}$ first time unit, the time domain location of the corresponding first time-frequency resource is from an $(N-X)^{th}$ first time unit to an $(N-Y)^{th}$ first time unit, and the frequency domain location of the corresponding first time-frequency resource may also be obtained based on related descriptions in Embodiment 1. Details are not described herein again. According to this embodiment, the terminal device monitors the first indication information only when necessary, so that a processing resource of the terminal device can be saved, to reduce energy consumption of the terminal device.

When finding, by decoding the first indication information, that a time-frequency resource used to receive a reference signal (RS) is preempted or affected, the terminal device may adjust a time sequence for feeding back channel state information (CSI) by the terminal device. The RS herein may be a CSI-RS or another RS. The CSI-RS is used as an example below for description. If a time-frequency resource used by the terminal device to receive the CSI-RS is preempted or affected, a relatively large deviation may be caused when the terminal device performs CSI measurement on a part of the CSI-RS on the preempted or affected time-frequency resource. After determining, based on the first indication information, that the time-frequency resource used to receive the CSI-RS is preempted or affected, the terminal device may perform CSI measurement again after eliminating the part of the CSI-RS on the time-frequency resource, to update a CSI measurement result. Considering that the update of the CSI measurement result may affect the CSI feedback time sequence, the time sequence for feeding back the CSI by the terminal device may be adjusted, so that the terminal device can feed back a more accurate CSI measurement result to the network device.

Figure 5A:
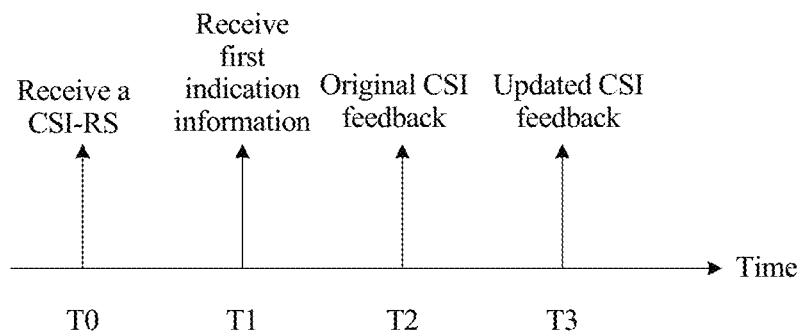
FIG. 5A is a schematic diagram of a CSI feedback time sequence according to an embodiment of this application.

FIG. 5A is a schematic diagram of a CSI feedback time sequence according to an embodiment of this application. As shown in FIG. 5A, the terminal device receives a CSI-RS at a moment T0, and performs CSI measurement based on the CSI-RS. T1 indicates a moment at which the terminal device receives the first indication information, and T1 is greater than T0. T2 indicates a moment at which the terminal device feeds back CSI based on the CSI-RS that is received at the moment T0. T3 indicates a moment at which the terminal device feeds back updated CSI. When T3 is less than or equal to T2, the CSI may be fed back at the moment T2 or may be fed back at the moment T3. When T3 is greater than T2, the CSI is fed back at the moment T3.

In a possible implementation, when the terminal device needs to monitor the first indication information, the terminal device adjusts a CSI feedback moment from T2 to T3. When the first indication information indicates that a part or all of a time-frequency resource for the CSI-RS is preempted or affected at the moment T0, the terminal device may eliminate, based on content of the first indication information, a part of the CSI-RS on the preempted or affected time-frequency resource, perform CSI measurement again on a remaining part of the CSI-RS to update a CSI measurement result, and feed back an updated CSI measurement result to the network device at the moment T3. Optionally, the terminal device further receives second indication information from the network device, where the second indication information is used to indicate whether the terminal device needs to monitor the first indication information. For example, when a cell accessed by the eMBB UE is a cell in which the eMBB UE and the URLLC UE coexist, the network device sends the second indication information to the UE to instruct the UE to monitor the first indication information, to determine whether a data transmission resource of the eMBB UE is preempted by URLLC. For the cell in which the eMBB UE and the URLLC UE coexist, the CSI feedback moment is adjusted from the moment T2 to the moment T3.

In another possible implementation, when T3 is greater than or equal to T2 and T2 is greater than T1, if the terminal device needs to monitor the first indication information but does not detect the first indication information, or the received first indication information indicates that the time-frequency resource for the CSI-RS is not preempted or affected at the moment T0, the terminal device feeds back the CSI measurement result to the network device at the moment T2.

The CSI feedback time sequence may be predefined in a protocol. For example, it is predefined in the protocol that T3=T1+$\Delta$t1 or T3=T2+$\Delta$t2. Alternatively, a parameter related to the CSI feedback time sequence may be determined on a network side and then notified to the terminal device by using RRC signaling or physical layer signaling. The parameter related to the CSI feedback time sequence may include $\Delta$t1, $\Delta$t2, and the like.

S530. The terminal device determines, based on the first indication information, whether information transmission on a third time-frequency resource is affected, where the third time-frequency resource is a time-frequency resource that is used for downlink information transmission between the terminal device and the network device.

The third time-frequency resource herein may overlap or may not overlap the first time-frequency resource. When the third time-frequency resource does not overlap the first time-frequency resource, it indicates that the information transmission of the terminal device is not affected by a URLLC service or other information transmission. When the third time-frequency resource overlaps the first time-frequency resource, the terminal device needs to perform further determining based on the content of the first indication information. The terminal device first determines the affected time-frequency resource B based on the content of the first indication information and a time-frequency range of the first time-frequency resource, and then determines whether the time-frequency resource B overlaps the third time-frequency resource. If the time-frequency resource B does not overlap the third time-frequency resource, it indicates that the information transmission of the terminal device is not affected by a URLLC service or other information transmission. If the time-frequency resource B has an overlapping time-frequency resource C with the third time-frequency resource, the overlapping time-frequency resource C is a time-frequency resource that is affected by preemption of the URLLC service data or affected by other information transmission. The terminal device may discard information received on the time-frequency resource C, where the information received on the time-frequency resource C does not participate in decoding or HARQ combination.

Based on internal logic of the technical solutions, Embodiment 1 to Embodiment 5 may be combined or mutual reference may be made to Embodiment 1 to Embodiment 5, to form a new embodiment. Details are not described herein.

In the foregoing embodiments provided in this application, the control information transmission method provided in the embodiments of this application is respectively described from perspectives of the network device used as a sending device, the terminal device used as a receiving device, and interaction between the sending device and the receiving device. It may be understood that, to implement the foregoing functions, the devices such as the sending device and the receiving device include a corresponding hardware structure and/or software module for performing the functions. A person skilled in the art should easily be aware that, in combination with units and method steps in the examples described in the embodiments disclosed in this specification, this application can be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

Figure 6:
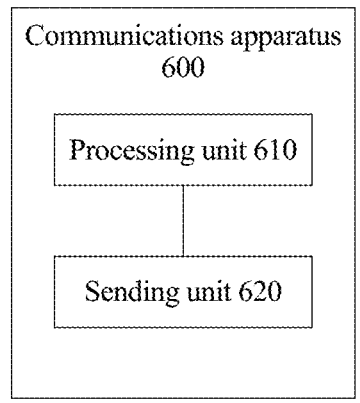
FIG. 6 is a schematic structural diagram of a communications apparatus according to an embodiment of this application.
Figure 7:
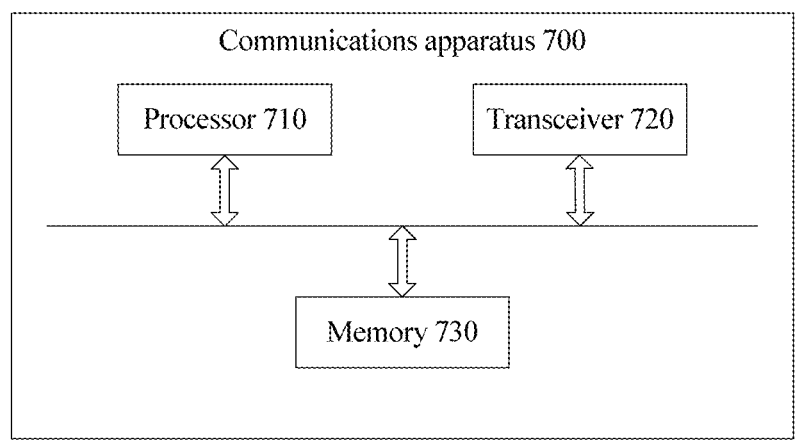
FIG. 7 is a schematic structural diagram of another communications apparatus according to an embodiment of this application.

FIG. 6 and FIG. 7 are two possible schematic structural diagrams of a communications apparatus according to an embodiment of this application. The communications apparatus implements a function of the network device used as a sending device in the foregoing method embodiments, and therefore can also achieve the beneficial effects in the foregoing method embodiments. In this embodiment of this application, the communications apparatus may be the radio access network device 220 shown in FIG. 2.

As shown in FIG. 6, a communications apparatus 600 includes a processing unit 610 and a sending unit 620.

The processing unit 610 is configured to determine first indication information, where the first indication information is used to indicate whether information transmission on a first time-frequency resource is affected.

The sending unit 620 is configured to send the first indication information through a physical downlink control channel.

The sending unit 620 is further configured to send first control information, where the first control information includes frequency domain location information of the first time-frequency resource.

Optionally, the frequency domain location information of the first time-frequency resource includes start location offset information and frequency domain width information.

Optionally, the first indication information includes second indication information with a length of m bits, where m is an integer greater than 1, each bit in the second indication information is used to indicate whether information transmission on one second time unit in the first time-frequency resource is affected, and a time domain length of the second time unit is less than or equal to a time domain length of the first time-frequency resource.

Optionally, the first indication information includes second indication information with a length of m bits, and each bit in the second indication information is used to indicate whether information transmission on one second time-frequency resource in the first time-frequency resource is affected, where m is an integer greater than 1, and a frequency domain width of the second time-frequency resource is less than or equal to a frequency domain width of the first time-frequency resource.

As shown in FIG. 7, a communications apparatus 700 includes a processor 710, a transceiver 720, and a memory 730. The memory 730 may be configured to store code to be executed by the processor 710. The components in the communications apparatus 700 communicate with each other through an internal connection path, for example, transfer a control and/or data signal through a bus.

The processor 710 is configured to determine first indication information, where the first indication information is used to indicate whether information transmission on a first time-frequency resource is affected.

The transceiver 720 is configured to send the first indication information through a physical downlink control channel.

The transceiver 720 is further configured to send first control information, where the first control information includes frequency domain location information of the first time-frequency resource.

Optionally, the frequency domain location information of the first time-frequency resource includes start location offset information and frequency domain width information.

Optionally, the first indication information includes second indication information with a length of m bits, where m is an integer greater than 1, each bit in the second indication information is used to indicate whether information transmission on one second time unit in the first time-frequency resource is affected, and a time domain length of the second time unit is less than or equal to a time domain length of the first time-frequency resource.

Optionally, the first indication information includes second indication information with a length of m bits, and each bit in the second indication information is used to indicate whether information transmission on one second time-frequency resource in the first time-frequency resource is affected, where m is an integer greater than 1, and a frequency domain width of the second time-frequency resource is less than or equal to a frequency domain width of the first time-frequency resource.

Other functional descriptions related to the processing unit 610, the processor 710, the sending unit 620, and the transceiver 720 may be directly obtained by referring to the foregoing method embodiments. In Method Embodiment 1 to Method Embodiment 5, an information sending function is implemented by the sending unit 620 and the transceiver 720, and other data processing functions are all implemented by the processing unit 610 and the processor 710. Details are not described herein.

Figure 8:
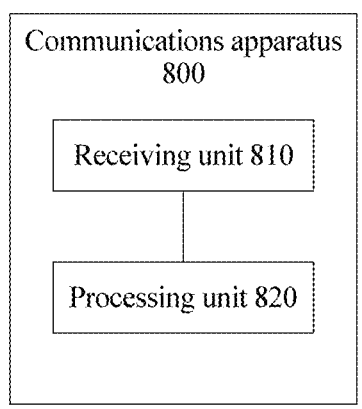
FIG. 8 is a schematic structural diagram of another communications apparatus according to an embodiment of this application.
Figure 9:
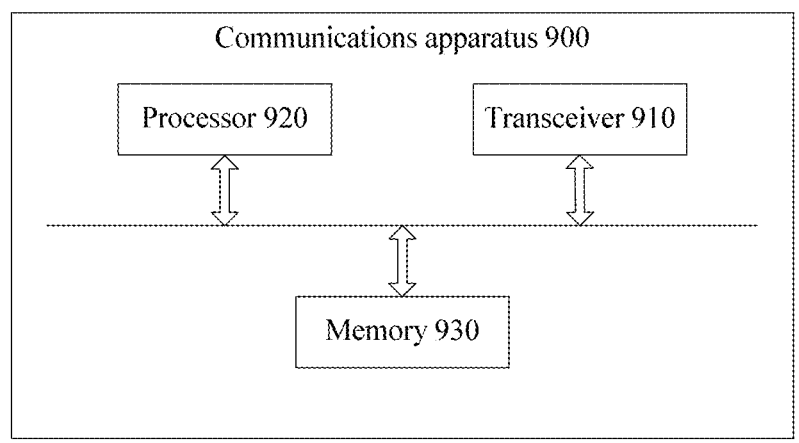
FIG. 9 is a schematic structural diagram of another communications apparatus according to an embodiment of this application.

FIG. 8 and FIG. 9 are other two possible schematic structural diagrams of a communications apparatus according to an embodiment of this application. The communications apparatus implements a function of the terminal device used as a receiving device in the foregoing method embodiments, and therefore can also achieve the beneficial effects in the foregoing method embodiments. In this embodiment of this application, the communications apparatus may be the terminal device 230 or the terminal device 240 shown in FIG. 2.

As shown in FIG. 8, a communications apparatus 800 includes a receiving unit 810 and a processing unit 820.

The receiving unit 810 is configured to receive first indication information through a physical downlink control channel, where the first indication information is used to indicate whether information transmission on a first time-frequency resource is affected.

The processing unit 820 is configured to determine, based on the first indication information, whether information transmission on a third time-frequency resource is affected, where the third time-frequency resource is a time-frequency resource that is used for downlink information transmission between the terminal device and a network device.

The receiving unit 810 is further configured to receive first control information, where the first control information includes frequency domain location information of the first time-frequency resource.

Optionally, the frequency domain location information of the first time-frequency resource includes start location offset information and frequency domain width information.

Optionally, the first indication information includes second indication information with a length of m bits, where m is an integer greater than 1, each bit in the second indication information is used to indicate whether information transmission on one second time unit in the first time-frequency resource is affected, and a time domain length of the second time unit is less than or equal to a time domain length of the first time-frequency resource.

Optionally, the first indication information includes second indication information with a length of m bits, and each bit in the second indication information is used to indicate whether information transmission on one second time-frequency resource in the first time-frequency resource is affected, where m is an integer greater than 1, and a frequency domain width of the second time-frequency resource is less than or equal to a frequency domain width of the first time-frequency resource.

As shown in FIG. 9, a communications apparatus 900 includes a processor 920, a transceiver 910, and a memory 930. The memory 930 may be configured to store code to be executed by the processor 920. The components in the communications apparatus 900 communicate with each other through an internal connection path, for example, transfer a control and/or data signal through a bus.

The transceiver 910 is configured to receive first indication information through a physical downlink control channel, where the first indication information is used to indicate whether information transmission on a first time-frequency resource is affected.

The processor 920 is configured to determine, based on the first indication information, whether information transmission on a third time-frequency resource is affected, where the third time-frequency resource is a time-frequency resource that is used for downlink information transmission between the terminal device and a network device.

The transceiver 910 is further configured to receive first control information, where the first control information includes frequency domain location information of the first time-frequency resource.

Optionally, the frequency domain location information of the first time-frequency resource includes start location offset information and frequency domain width information.

Optionally, the first indication information includes second indication information with a length of m bits, where m is an integer greater than 1, each bit in the second indication information is used to indicate whether information transmission on one second time unit in the first time-frequency resource is affected, and a time domain length of the second time unit is less than or equal to a time domain length of the first time-frequency resource.

Optionally, the first indication information includes second indication information with a length of m bits, and each bit in the second indication information is used to indicate whether information transmission on one second time-frequency resource in the first time-frequency resource is affected, where m is an integer greater than 1, and a frequency domain width of the second time-frequency resource is less than or equal to a frequency domain width of the first time-frequency resource.

It may be understood that, FIG. 7 and FIG. 9 each show merely a design of the communications apparatus. During actual application, the communications apparatus may include any quantity of receivers and any quantity of processors, and all communications apparatuses that can implement the embodiments of this application fall within the protection scope of this application.

Other functional descriptions related to the receiving unit 810, the transceiver 910, the processing unit 820, and the processor 920 may be directly obtained by referring to the foregoing method embodiments. In Method Embodiment 1 to Method Embodiment 5, an information receiving function is implemented by the receiving unit 810 and the transceiver 910, and other data processing functions are all implemented by the processing unit 820 and the processor 920. Details are not described herein.

The apparatus embodiments shown in FIG. 6 to FIG. 9 are obtained by referring to some of the foregoing method embodiments. It may be understood that, apparatus embodiments corresponding to other method embodiments of this application may be correspondingly obtained by referring to the other method embodiments of this application and the apparatus embodiments shown in FIG. 6 to FIG. 9. Details are not described herein.

It may be understood that, when the embodiments of this application are applied to a network device chip, the network device chip implements a function of the network device in the foregoing method embodiments. The network device chip sends the first indication information and the first control information to another module (for example, a radio frequency module or an antenna) in the network device. The first indication information and the first control information are sent to the terminal device by using the another module in the network device.

When the embodiments of this application are applied to a terminal device chip, the terminal device chip implements a function of the terminal device in the foregoing method embodiments. The terminal device receives the first indication information and the first control information from another module (for example, a radio frequency module or an antenna) in the terminal device. The first indication information and the first control information are sent by the network device to the terminal device.

It may be understood that the processor in the embodiments of this application may be a central processing unit (CPU), may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor.

The method steps in the embodiments of this application may be implemented by hardware, or may be implemented by a processor by executing a software instruction. The software instruction may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. An example storage medium is coupled to the processor, so that the processor can read information from the storage medium and can write information into the storage medium. Certainly, the storage medium may alternatively be a component of the processor. The processor and the storage medium may be located in an ASIC. In addition, the ASIC may be located in a sending device or a receiving device. Certainly, the processor and the storage medium may alternatively exist in a sending device or a receiving device as discrete components.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The term "a plurality of" in this specification means "two or more". The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects; and the character "/" in a formula indicates a "division" relationship between the associated objects.

It may be understood that, various numerals in the embodiments of this application are merely used for distinguishing for ease of description, and are not intended to limit the scope of the embodiments of this application.

It may be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

The foregoing descriptions are merely specific implementations of the embodiments of this application. Any variation or replacement readily figured out by a person skilled in the art within the technical scope disclosed in this application shall fall within the protection scope of the embodiments of this application.

What is claimed is:

1. A method, comprising:
receiving, by a terminal device via radio resource control (RRC) signaling, an indication indicating a segmentation method in a plurality of segmentation methods for a first time-frequency resource, the segmentation method being a first segmentation method or a second segmentation method, the first segmentation method indicating that the first time-frequency resource comprises a pre-configured number of subsets of time-frequency resources grouped in a time domain, and the second segmentation method indicating that the first time-frequency resource comprises the pre-configured number of time-frequency resources grouped in both the time domain and a frequency domain, wherein the pre-configured number is m, and m is an integer greater than 1;
receiving, by the terminal device, first indication information through a physical downlink control channel, wherein the first indication information comprises second indication information with a length of m bits, and each bit of the second indication information corresponds to a subset of the pre-configured number of subsets of time-frequency resources and indicates whether no transmission to the terminal device is present in a corresponding subset; and
determining, by the terminal device based on the segmentation method and the first indication information, a first subset from the pre-configured number of subsets of time-frequency resources, with no transmission to the terminal device present in the first subset.

2. The method according to claim 1, wherein the segmentation method is the first segmentation method, each subset comprises a first time domain unit, and a time domain length of the first time domain unit is less than a time domain length of the first time-frequency resource, and the first time-frequency resource comprises n second time domain units which are grouped into m first time domain units, wherein n=k*m+r, m, n, and k are positive integers, r is an integer greater than or equal to zero and r is less than m, each of first r first time domain units of the m first time domain units comprises k+1 second time domain units, and each of rest of m−r first time domain units of the m first time domain units comprises k second time domain units.

3. The method according to claim 1, wherein the segmentation method is the second segmentation method, and each subset comprises a first frequency domain unit and a first time domain unit;
wherein the first time-frequency resource comprises n second time domain units that are grouped into m1 first time domain units, and the first time-frequency resource comprises f second frequency domain units that are grouped into n1 first frequency domain units, and wherein m1*n1=m;
wherein n=k1*m1+r1, m1, n, and k1 are positive integers, r1 is an integer greater than or equal to zero and r1 is less than m1, each of first r1 first time domain units of the m1 first time domain units comprises k1+1 second time domain units, and each of rest of m1−r1 first time domain units of the m1 first time domain units comprises k1 second time domain units; and
wherein f=k2*n1+r2, n1, f, and k2 are positive integers, r2 is an integer greater than or equal to zero and r2 is less than n1, each of first r2 first frequency domain units of the n1 first frequency domain units comprises k2+1 second frequency domain units, and each of rest of n1−r2 first frequency domain units of the n1 first frequency domain units comprises k2 second frequency domain units.

4. The method according to claim 3, wherein m1 is equal to 7 and n1 is equal to 2.

5. The method according to claim 1, wherein m is equal to 14.

6. The method according to claim 1, wherein a time domain length of the first time-frequency resource is equal to a monitoring period of the first indication information.

7. The method according to claim 6, wherein when the first indication information is received at a time represented by an Nth first time domain unit, and a sending interval of the first indication information is equal to a span of T first time domain units, the first time-frequency resource is located in the time domain from an $(N-T)^{th}$ first time domain unit to an $(N-1)^{th}$ first time domain unit, wherein N and T are positive integers, and T is less than or equal to N.

8. An apparatus comprising:
a processor; and
a non-transitory computer readable medium storing a program to be executed by the processor, the program comprises instructions for:
receiving, via radio resource control (RRC) signaling, an indication indicating a segmentation method in a plurality of segmentation methods for a first time-frequency resource, the segmentation method being a first segmentation method or a second segmentation method, the first segmentation method indicating that the first time-frequency resource comprises a pre-configured number of subsets of time-frequency resources grouped in a time domain, and the second segmentation method indicating that the first time-frequency resource comprises the pre-configured number of subsets of time-frequency resources grouped in both the time domain and a frequency domain, wherein the pre-configured number is m, and m is an integer greater than 1;
receiving first indication information through a physical downlink control channel, wherein the first indication information comprises second indication information with a length of m bits, and each bit of the second indication information corresponds to one subset of the pre-configured number of subsets of time-frequency resources and indicates whether no transmission to the apparatus is present in a corresponding subset; and
determining, based on the segmentation method and the first indication information, a first subset from the pre-configured number of subsets of time-frequency resources, with no transmission to the apparatus present in the first subset.

9. The apparatus according to claim 8, wherein the segmentation method is the first segmentation method, each subset comprises a first time domain unit, and a time domain length of the first time domain unit is less than a time domain length of the first time-frequency resource.

10. The apparatus according to claim 9, wherein the first time-frequency resource comprises n second time domain units which are grouped into m first time domain units, wherein n=k*m+r, m, n, and k are positive integers, r is an integer greater than or equal to zero and r is less than m, each of first r first time domain units of the m first time domain units comprises k+1 second time domain units, and each of rest of m−r first time domain units of the m first time domain units comprises k second time domain units.

11. The apparatus according to claim 8, wherein the segmentation method is the second segmentation method, and each subset comprises a first frequency domain unit and a first time domain unit.

12. The apparatus according to claim 11, wherein
the first time-frequency resource comprises n second time domain units that are grouped into m1 first time domain units, and the first time-frequency resource comprises f second frequency domain units that are grouped into n1 first frequency domain units, wherein m1*n1=m;
wherein n=k1*m1+r1, m1, n, and k1 are positive integers, r1 is an integer greater than or equal to zero and r1 is less than m1, each of first r1 first time domain units of the m1 first time domain units comprises k1+1 second time domain units, and each of rest of m1−r1 first time domain units of the m1 first time domain units comprises k1 second time domain units; and
wherein f=k2*n1+r2, n1, f, and k2 are positive integers, r2 is an integer greater than or equal to zero and r2 is less than n1, each of first r2 first frequency domain units of the n1 first frequency domain units comprises k2+1 second frequency domain units, and each of rest of n1−r2 first frequency domain units of the n1 first frequency domain units comprises k2 second frequency domain units.

13. The apparatus according to claim 12, wherein m1 is equal to 7 and n1 is equal to 2.

14. The apparatus according to claim 8, wherein m is equal to 14.

15. An apparatus comprising:
a processor; and
a non-transitory computer readable medium storing a program to be executed by the processor, the program comprises instructions for:
determining a segmentation method for a first time-frequency resource in a plurality of segmentation methods, the segmentation method being a first segmentation method or a second segmentation method, the first segmentation method indicating that the first time-frequency resource comprises a pre-configured number of subsets of time-frequency resources grouped in a time domain, and the second segmentation method indicating that the first time-frequency resource comprises the pre-configured number of subsets of time-frequency resources grouped in both the time domain and a frequency domain, wherein the pre-configured number is m, and m is an integer greater than 1;
sending an indication indicating the segmentation method to a terminal device via radio resource control (RRC) signaling;
determining first indication information, wherein the first indication information comprises second indication information with a length of m bits, and each bit of the second indication information corresponds to a subset of the pre-configured number of subsets of time-frequency resources and indicates whether no transmission to the terminal device is present in a corresponding subset; and
sending the first indication information to the terminal device through a physical downlink control channel.

16. The apparatus according to claim 15, wherein the segmentation method is the first segmentation method, each subset comprises a first time domain unit, and a time domain length of the first time domain unit is less than a time domain length of the first time-frequency resource, and the first time-frequency resource comprises n second time domain units which are grouped into m first time domain units, wherein n=k*m+r, m, n, and k are positive integers, r is an integer greater than or equal to zero and r is less than m, each of first r first time domain units of the m first time domain units comprises k+1 second time domain units, and each of rest of m−r first time domain units of the m first time domain units comprises k second time domain units.

17. The apparatus according to claim 15, wherein the segmentation method is the second segmentation method, and each subset comprises a first frequency domain unit and a first time domain unit;
wherein the first time-frequency resource comprises n second time domain units that are grouped into m1 first time domain units, and the first time-frequency resource comprises f second frequency domain units that are grouped into n1 first frequency domain units, and wherein m1*n1=m;
wherein n=k1*m1+r1, m1, n, and k1 are positive integers, r1 is an integer greater than or equal to zero and r1 is less than m1, each of first r1 first time domain units of the m1 first time domain units comprises k1+1 second time domain units, and each of rest of m1−r1 first time domain units of the m1 first time domain units comprises k1 second time domain units; and
wherein f=k2*n1+r2, n1, f, and k2 are positive integers, r2 is an integer greater than or equal to zero and r2 is less than n1, each of first r2 first frequency domain units of the n1 first frequency domain units comprises k2+1 second frequency domain units, and each of rest of n1−r2 first frequency domain units of the n1 first frequency domain units comprises k2 second frequency domain units.

18. The apparatus according to claim 17, wherein m1 is equal to 7 and n1 is equal to 2.

19. The apparatus according to claim 15, wherein m is equal to 14.

20. The apparatus according to claim 15, wherein a time domain length of the first time-frequency resource is equal to a monitoring period of the first indication information.

* * * * *